(12) United States Patent
Morita et al.

(10) Patent No.: US 7,799,894 B2
(45) Date of Patent: *Sep. 21, 2010

(54) ELECTRODE FOR ENERGY STORAGE DEVICE AND PROCESS FOR PRODUCING THE SAME

(75) Inventors: Masayuki Morita, Ube (JP); Nobuko Yoshimoto, Ube (JP); Yasuaki Mukai, Ube (JP); Mikio Kasai, Funabashi (JP); Hitoshi Furusho, Funabashi (JP)

(73) Assignees: Yamaguchi University, Yamaguchi-shi (JP); Nissan Chemical Industries, Ltd., Tokyo (JP)

( * ) Notice: Subject to any disclaimer, the term of this patent is extended or adjusted under 35 U.S.C. 154(b) by 1053 days.

This patent is subject to a terminal disclaimer.

(21) Appl. No.: 10/588,232

(22) PCT Filed: Feb. 1, 2005

(86) PCT No.: PCT/JP2005/001388

§ 371 (c)(1),
(2), (4) Date: Aug. 3, 2006

(87) PCT Pub. No.: WO2005/076295

PCT Pub. Date: Aug. 18, 2005

(65) Prior Publication Data

US 2007/0120112 A1    May 31, 2007

(30) Foreign Application Priority Data

Feb. 6, 2004    (JP) ............................. 2004-030014

(51) Int. Cl.
C08G 73/06    (2006.01)

(52) U.S. Cl. .................. 528/424; 528/423; 257/40; 544/353

(58) Field of Classification Search .................. 257/40; 528/423, 424; 544/353
See application file for complete search history.

(56) References Cited

U.S. PATENT DOCUMENTS

| | | | |
|---|---|---|---|
| 4,356,429 A | 10/1982 | Tang | |
| 6,258,337 B1 | 7/2001 | Sonobe et al. | |
| 6,310,762 B1 | 10/2001 | Okamura et al. | |
| 6,548,670 B1 | 4/2003 | Burdeniuc | |
| 6,738,252 B2 | 5/2004 | Okamura et al. | |
| 2002/0073534 A1 | 6/2002 | Kurosaki et al. | |
| 2003/0215701 A1 | 11/2003 | Nagasaki et al. | |
| 2006/0128937 A1 | 6/2006 | Nagasaki et al. | |
| 2009/0030176 A1* | 1/2009 | Kasai et al. .................. | 528/423 |

FOREIGN PATENT DOCUMENTS

| | | |
|---|---|---|
| EP | 1 361 244 A1 | 11/2003 |
| EP | 1361244 A1 | 11/2003 |
| EP | 1 640 402 A1 | 3/2006 |
| JP | 7-70306 A | 3/1995 |
| JP | 11-506123 A | 6/1999 |
| JP | 11-214270 A | 8/1999 |
| JP | 11-297577 A | 10/1999 |
| JP | 11-317333 A | 11/1999 |
| JP | 2000-53956 A | 2/2000 |
| JP | 2000-68164 A | 3/2000 |
| JP | 2000-100668 A | 4/2000 |
| JP | 2000-509730 A | 8/2000 |
| JP | 2002-134162 A | 5/2002 |
| JP | 2003-55351 A | 2/2003 |
| JP | 2004-83563 A | 3/2004 |
| SU | 592823 | 2/1978 |
| WO | WO-97/32873 A1 | 9/1997 |
| WO | WO-98/38186 A1 | 9/1998 |
| WO | WO-2004/111108 A1 | 12/2004 |

OTHER PUBLICATIONS

Rudge et al., Journal of Power Sources, vol. 47, 1994, pp. 89-107.
Mukai, Dai 44 Kai Battery Symposium in Japan, Nov. 4, 2003, pp. 672-673.
United States Office Action dated Aug. 27, 2009 in corresponding U.S. Appl. No. 10/585,757.
United States Office Action dated Jun. 9, 2009 in corresponding U.S. Appl. No. 10/585,757.

(Continued)

*Primary Examiner*—Randy Gulakowski
*Assistant Examiner*—Shane Fang
(74) *Attorney, Agent, or Firm*—Birch, Stewart, Kolasch & Birch, LLP

(57) ABSTRACT

An electrode for an energy storage device containing a polyaminoquinoxaline compound of the following formula (1a) is provided as having a highly densified energy level and being small in size and light in weight.

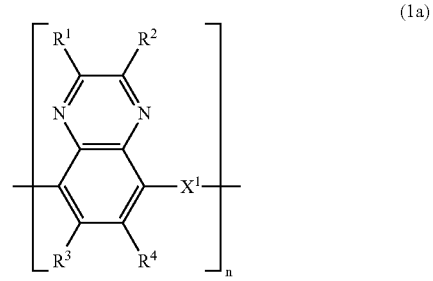

(1a)

$R^1$ and $R^2$ independently represent a hydrogen atom, a hydroxyl group, a $C_1$-$C_{10}$ alkyl group, a $C_1$-$C_{10}$ alkoxy group or the like, $R^3$ and $R^4$ independently represent a hydrogen atom, a halogen atom, a cyano group, a nitro group, an amino group, a $C_1$-$C_{10}$ alkyl group, a $C_1$-$C_{10}$ alkoxy group or the like, $X^1$ represents —NH—$R^5$—NH— or —NH—$R^6$— wherein $R^5$ and $R^6$ independently represent a $C_1$-$C_{10}$ alkylene group, —C(O)$CH_2$—, —$CH_2$C(O)— or the like, and n is an integer of 2 or over.

29 Claims, No Drawings

OTHER PUBLICATIONS

Volf et al., Solid State Ionics, vol. 154-155, 2002, pp. 57-63.
Albini et al., Journal of the Chemical Society, Perkin Transactions 1, vol. 3, 1978, pp. 299-303.
Furusho et al., Journal of Photopolymer Science and Technology, vol. 15, No. 1, 2002, pp. 133-136.
Bauldreay et al., Electrochimica Acta, vol. 28, No. 11, 1983, pp. 1515-1522.
Pfeiffer et al., Journal of Organic Chemistry, vol. 31, No. 10, Oct. 1966, pp. 3384-3390.
Gaertner et al., Tetrahedron, vol. 18, 1962, pp. 1105-1114.
Cookson, Journal of the Chemical Society, 1953, pp. 1328-1331.
Platt et al., Journal of the Chemical Society, No. 429, 1948, pp. 2129-2134.
R.H. Partridge, Polymer, the United Kingdom, Jun. 1983, vol. 24, pp. 748-754.
Seiji Hayashi et al., Japanese Journal of Applied Physics, vol. 25, No. 9, Sep. 1986, pp. L773-L775.
C.W. Tang et al., Applied Physics Letters, United States of America, Sep. 21, 1987, vol. 51, (12) pp. 913-915.
Denki Kagaku, Electrochemistry and Industrial Physicochemistry, 1986, vol. 54, No. 4, pp. 306-311.
S. Tanaka et al., Synthetic Metals, vol. 69 (1995), pp. 599-600.
Journal of the American Chemical Society, the United States of America, 1995, vol. 117, No. 25, pp. 6791-6792.
Chen et al., Acta Pharmaceutica Sinica, vol. 27, No. 6, pp. 418-422, (1992).
Nowak et al., Database CAPLUS on STN, AN 1997:615604, DN 127:293190, vol. 93, No. 6, pp. 22-28, (1996).
Thomas et al., Journal of Electroanalytical Chemistry, vol. 501, No. 1-2, pp. 235-240, (2001).
International Preliminary Examination Report on Patentability (Form PCT/IPEA/409), 2005.
International Search Report, 2005.
Kasai M et al., "An Electrochemical Capacitor System using Polymeric Electrodes of Aminoquinoxalines" Meeting Abstracts, 2004 Joint International Meeting, 206TH Meeting of the Electrochemical Society/2004 Fall Meeting of the Electrochemical Society of Japan, MA 2004-02, Electrochemical Society Inc., US, 2004, p. 647, XP008121477 ISSN:1091-8213.

* cited by examiner

ELECTRODE FOR ENERGY STORAGE DEVICE AND PROCESS FOR PRODUCING THE SAME

PARTIES TO A JOINT RESEARCH AGREEMENT

The claimed invention was made by or on behalf of YAMAGUCHI UNIVERSITY and/or NISSAN CHEMICAL INDUSTRIES, LTD., who are each parties to a joint research agreement that was in effect on or before the date the claimed invention was made. The claimed invention was made as the result of activities undertaken within the scope of the joint research agreement.

TECHNICAL FIELD

This invention relates to an electrode for energy storage device and also to a method for making the same. More particularly, the invention relates to an electrode for energy storage devices containing an aminoquinoxaline polymer as an active material for the electrode and the manufacture thereof.

BACKGROUND ART

An electric double layer capacitor that is known as one of energy storage devices is generally constituted of a pair of polarizable electrodes each containing a porous material, a separator, an electrolyte solution and the like. This electric double layer capacitor is a device which makes use, as a charge and discharge mechanism, of an electric energy ascribed to the electric double layer established through ionic movement at the interface between the electrodes. Because no electrochemical reaction of an electrode active material is involved, the capacitor does not have such a life as of secondary cells, along with characteristic features including excellent instantaneous charge and discharge characteristics, stable charge and discharge characteristics kept over a wide temperature range, and a reduced lowering of performance in repeated use.

It has been hitherto accepted that the electrostatic capacitance of an electric double layer capacitor has a proportional relation with surface areas of polarizable electrodes. Accordingly, porous materials having a large specific surface area have been studied for use as a polarizable electrode in order to increase the capacitance.

More particularly, the polarizable electrode has been usually made by mixing a porous material such as a carbonaceous material or the like, acetylene black used as a conductive auxiliary agent, and a fluorine polymer or rubbery polymer to obtain an electrode composition, and applying the electrode composition onto a current collector. For instance, attempts have been made to enhance the electrostatic capacitance by using, as a carbonaceous material, active carbon (or a porous carbonaceous material) that exhibits high electric conductivity, is relatively stable in electrochemical aspect and has a large specific surface area.

More particularly, a carbonaceous material, such as coal, coal coke, coconut shell, wood flour, resins and the like, is subjected activation (porous treatment) with an oxidative gas such as steam, air, oxygen, $CO_2$ or the like or by means of a chemical such as zinc chloride, potassium hydroxide or the like, thereby forming fine pores therein. The resulting active carbon with a large surface area has been used.

In recent years, as developments in electronics devices, electric cars and the like are being in progress, the fundamental design of energy storage devices including an electric double layer capacitor is also being changed.

For instance, an electric double layer capacitor needs to have an energy highly densified and be small in size and light in weight. Hence, it becomes necessary to design the capacitor so that not only an electrostatic capacitance per unit weight (F/g) of porous material, but also an electrostatic capacitance per unit volume ($F/cm^3$) is improved (see Patent Document 2: JP-A 2000-68164; Patent Document 3: JP-A 2000-100668; and Patent Document 5: JP-A 11-214270).

The electrostatic capacitance per unit weight of a porous material (polarizable electrode) can be increased by using such a porous material with a large surface area as set out hereinabove.

However, as the specific surface area increases, the density (fill rate) of a porous material lowers. In this sense, the electrostatic capacitance per unit volume is not always in proportional relation with an increase in specific surface area. In fact, it is known that when the specific surface area increases to or over a certain extent, the electrostatic capacitance per unit volume tends to lower.

Thus, when using only the procedure of trying to increase the specific surface area of a porous material, limitation is placed on the increase of the electrostatic capacitance of an electric double layer capacitor, thus making it difficult to attain the high densification of an energy to a level required in recent years (see Patent Document 1: JP-A 11-317333 and Patent Document 4: JP-A 11-297577).

On the other hand, developments have been made on energy storage devices such as polymer cells or capacitors using conductive polymers as an electrode active material.

Where positive and negative electrodes are, respectively, made of a conductive polymer of a similar type, it is limited to broaden a reaction potential depending on the oxidation-reduction potential of the positive and negative electrodes. Thus, it is generally difficult to make a polymer cell or capacitor which works at high voltage.

Polythiophene is a substance whose HOMO (highest occupied molecular orbital) and LUMO (lowest occupied molecular orbital) are, respectively, observed at oxidation side and reduction side positions of about 0.7 V and about 2.3 V when measuring by use of a silver/silver oxide electrode as a reference electrode. From this, it can be expected that this compound exhibits wide potential activity under conditions where a conductive polymer of a similar type is used for the positive and negative electrodes, respectively. Thus, studies have been made on an electrode using polythiophene to provide a wide voltage range (see Non-Patent Document 1: Journal Power Source).

Further, a polymer cell or capacitor has been already developed wherein different types of conductive polymers are used as positive and negative electrodes, respectively, in such a way that a conductive polymer more susceptible to oxidation is used as a positive electrode and a conductive polymer more susceptible to reduction is used as a negative electrode. The cell or capacitor is usable over a wide voltage range with the capacitance being high (see Patent Document 6: JP-A 2002-134162). In this cell or capacitor, poly-5-cyanoindole is used as a positive electrode active material, and polyphenylquinoxaline is used as a negative electrode active material.

However, since this energy storage device needs to use different types of molecules in the positive and negative electrodes as set out hereinabove, this is defective from the standpoint of productivity. Thus, there is a demand for development of a conductive polymer compound that can be used as both positive and negative electrodes and can serve as an electrode active material showing wide potential activity.

Patent Document 1: JP-A 11-317333
Patent Document 2: JP-A 2000-68164
Patent Document 3: JP-A 2000-100668
Patent Document 4: JP-A 11-297577
Patent Document 5: JP-A 11-214270
Patent Document 6: JP-A 2002-134162
Non-Patent Document 1: Journal Power Source, Vol. 47, page 89, 1994

DISCLOSURE OF INVENTION

Problems to be Solved by the Invention

Under these circumstances, the invention has been accomplished and has for its object the provision of an electrode for energy storage devices and a method for making same wherein an electric energy can be densified at a required level and thus, the device can be made small in size and lightweight.

Means for Solving the Problems

In order to achieve the above object, we made intensive studies and, as a result, found that an electrode containing, as an electrode active material, a conductive polymer obtained by polymerizing a novel aminoquinoxaline compound enables the use, as an energy source, of the oxidation-reduction reaction of the polymer compound and the electric double layer occurring on the surface of the polymer compound. Thus, the device using such electrodes is able to store charges at a higher capacitance than a device using electrodes made mainly of known active carbon. The invention has been accomplished based on the above finding.

More particularly, the invention contemplates to provide the following electrodes for an energy storage device, energy storage devices including the electrodes, and methods for making the electrodes.

[1] An electrode for an energy storage device including a polyaminoquinoxaline compound of the following formula (1a) as an electrode active material

[Chemical Formula 1]

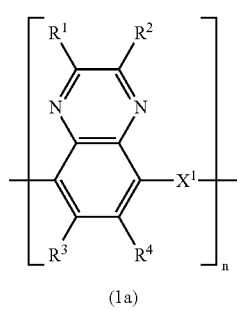

(1a)

wherein $R^1$ and $R^2$ independently represent a hydrogen atom, a hydroxyl group, a $C_1$-$C_{10}$ alkyl group, a $C_1$-$C_{10}$ alkoxy group, a phenyl group which may be substituted with Y, a pyridyl group which may be substituted with Y, a biphenyl group which may be substituted with Y, a naphthyl group which may be substituted with Y, a thienyl group which may be substituted with Y, a pyrrolyl group which may be substituted with Y, a furyl group which may be substituted with Y or a condensed heteroaryl group which may be substituted with Y provided that when $R^1$ and $R^2$ are, respectively, the above-defined phenyl, pyridyl, biphenyl, naphthyl, thienyl, pyrrolyl, furyl or condensed heteroaryl group, these groups may be joined through a single bond; $R^3$ and $R^4$ independently represent a hydrogen atom, a halogen atom, a cyano group, a nitro group, an amino group, a $C_1$-$C_{10}$ alkyl group, a $C_1$-$C_{10}$ alkoxy group, a phenyl group which may be substituted with Y, a pyridyl group which may be substituted with Y, a biphenyl group which may be substituted with Y, a naphthyl group which may be substituted with Y, a thienyl group which may be substituted with Y, a pyrrolyl group which may be substituted with Y, a furyl group which may be substituted with Y or a condensed heteroaryl group which may be substituted with Y provided that when $R^3$ and $R^4$ are, respectively, the above-defined phenyl, pyridyl, biphenyl, naphthyl, thienyl, pyrrolyl, furyl or condensed heteroaryl group, these groups may be joined through a single bond; $X^1$ represents —NH—$R^5$—NH— or —NH—$R^6$— wherein $R^5$ and $R^6$ independently represent a $C_1$-$C_{10}$ alkylene group, a —C(O)$CH_2$—, —$CH_2$C(O)—, a divalent benzene ring which may be substituted with Y, a divalent pyridine ring which may be substituted with Y, a divalent biphenyl group which may be substituted with Y, a divalent naphthalene ring which may be substituted with Y, a divalent thiophene ring which may be substituted with Y, a divalent pyrrole ring which may be substituted with Y, a furan ring which may be substituted with Y, or a condensed hetero ring which may be substituted with Y, in which Y represents a halogen atom, a cyano group, a nitro group, an amino group, an epoxy group, a vinyl group, a $C_1$-$C_{10}$ alkyl group, a $C_1$-$C_{10}$ haloalkyl group, a $C_1$-$C_{10}$ alkoxy group, a $C_1$-$C_{10}$ cyanoalkyl group, a phenyl group which may be substituted with Z, a pyridyl group which may be substituted with Z, a biphenyl group which may be substituted with Z, a naphthyl group which may be substituted with Z, a thienyl group which may be substituted with Z, a pyrrolyl group which may be substituted with Z, a furyl group which may be substituted with Z or a condensed heteroaryl group which may be substituted with Z provided that if Y is two or more in number, Y may be the same or different, in which Z represents a halogen atom, a cyano group, a nitro group, an amino group, an epoxy group, a vinyl group, a $C_1$-$C_{10}$ alkyl group, a $C_1$-$C_{10}$ haloalkyl group, a $C_1$-$C_{10}$ alkoxy group, a $C_1$-$C_{10}$ cyanoalkyl group, a phenyl group, a biphenyl group, a naphthyl group, a thienyl group, a pyrrolyl group, a furyl group or a condensed heteroaryl group provided that if Z is two or more in number, Z may be the same or different; and n is an integer of 2 or over.

[2] The electrode as recited in 1 above, wherein $R^1$ and $R^2$ independently represent a group of the following formula (2)

[Chemical Formula 2]

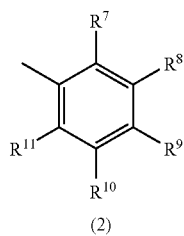

(2)

wherein $R^7$-$R^{11}$ independently represent a hydrogen atom, a halogen atom, a cyano group, a nitro group, an amino group, an epoxy group, a vinyl group, a $C_1$-$C_{10}$ alkyl group, a $C_1$-$C_4$ haloalkyl group, a $C_1$-$C_{10}$ alkoxy group, a $C_1$-$C_4$ cyanoalkyl group, a phenyl group which may be substituted with Z, a naphthyl group which may be substituted with Z or a thienyl group which may be substituted with Z in which Z has the same meaning as defined above.

[3] The electrode as recited in 1 above, wherein $R^1$ and $R^2$ independently represent a group of the following formula (3)

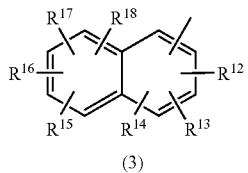

[Chemical Formula 3]

(3)

wherein $R^{12}$-$R^{18}$ independently represent, each substituted at an arbitrary position of the ring of the formula, a hydrogen atom, a halogen atom, a cyano group, a nitro group, an amino group, an epoxy group, a vinyl group, a $C_1$-$C_{10}$ alkyl group, a $C_1$-$C_{10}$ alkoxy group, a phenyl group which may be substituted with Z, a naphthyl group which may be substituted with Z or a thienyl group which may be substituted with Z in which Z has the same meaning as defined above.

[4] The electrode as recited above, wherein $R^1$ and $R^2$ independently represent a group of the following formula (4)

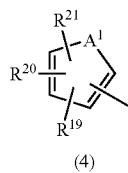

[Chemical Formula 4]

(4)

wherein $R^{19}$-$R^{21}$ independently represent, each substituted at an arbitrary position of the ring of the formula, a hydrogen atom, a halogen atom, a cyano group, a nitro group, an amino group, an epoxy group, a vinyl group, a $C_1$-$C_{10}$ alkyl group, a $C_1$-$C_{10}$ alkoxy group, a phenyl group which may be substituted with Z, a naphthyl group which may be substituted with Z or a thienyl group which may be substituted with Z in which Z has the same meaning as defined above; and $A^1$ represents NH, O or S.

[5] The electrode as recited in 1 above, wherein $R^1$ and $R^2$ independently represent a group of the following formula (5)

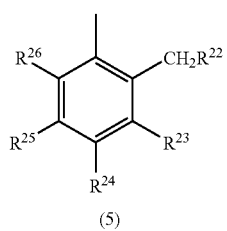

[Chemical Formula 5]

(5)

wherein $R^{22}$ represents a halogen atom or a cyano group, and $R^{23}$-$R^{26}$ independently represent a hydrogen atom, a halogen atom, a cyano group, a nitro group, an amino group, an epoxy group, a vinyl group, a $C_1$-$C_{10}$ alkyl group, a $C_1$-$C_{10}$ alkoxy group, a phenyl group which may be substituted with Z, a naphthyl group which may be substituted with Z or a thienyl group which may be substituted with Z, in which Z has the same meaning as defined above.

[6] The electrode as recited in any one of 1 to 5 above, wherein $R^5$ represents a group of the following formula (6)

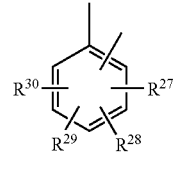

[Chemical Formula 6]

(6)

wherein $R^{27}$-$R^{30}$ independently represent, each substituted at an arbitrary position on the ring of the formula, a hydrogen atom, a halogen atom, a cyano group, a nitro group, an amino group, an epoxy group, a vinyl group, a $C_1$-$C_{10}$ alkyl group, a $C_1$-$C_{10}$ alkoxy group, a phenyl group which may be substituted with Z, a naphthyl group which may be substituted with Z or a thienyl group which may be substituted with Z, in which Z has the same meaning as defined above.

[7] The electrode as recited in any one of 1 to 5 above, wherein $R^5$ represents a group of the following formula (7)

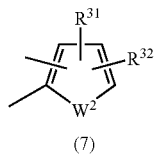

[Chemical Formula 7]

(7)

wherein $R^{31}$-$R^{32}$ independently represent, each substituted at an arbitrary position on the ring of the formula, a hydrogen atom, a halogen atom, a cyano group, a nitro group, an amino group, an epoxy group, a vinyl group, a $C_1$-$C_{10}$ alkyl group, a $C_1$-$C_{10}$ alkoxy group, a phenyl group which may be substituted with Z, a naphthyl group which may be substituted with Z or a thienyl group which may be substituted with Z, in which Z has the same meaning as defined above; and $W^1$ represents NH, O or S.

[8] The electrode as recited in any one of 1 to 5 above, wherein $R^5$ represents a group of the following formula (8)

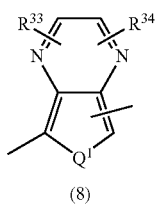

[Chemical Formula 8]

(8)

wherein $R^{33}$-$R^{34}$ independently represent, each substituted at an arbitrary position on the ring of the formula, a hydrogen atom, a halogen atom, a cyano group, a nitro group, an amino group, an epoxy group, a vinyl group, a $C_1$-$C_{10}$ alkyl group, a $C_1$-$C_{10}$ alkoxy group, a phenyl group which may be substituted with Z, a naphthyl group which may be substituted with Z or a thienyl group which may be substituted with Z, in which Z has the same meaning as defined above; and $Q^1$ represents NH, O or S.

[9] The electrode as recited in any one of 1 to 5, wherein $R^5$ represents a group of the following formula (9)

[Chemical Formula 9]

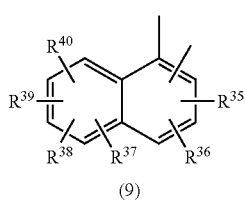

(9)

wherein $R^{35}$-$R^{40}$ independently represent, each substituted at an arbitrary position on the ring of the formula, a hydrogen atom, a halogen atom, a cyano group, a nitro group, an amino group, an epoxy group, a vinyl group, a $C_1$-$C_{10}$ alkyl group, a $C_1$-$C_{10}$ alkoxy group, a phenyl group which may be substituted with Z, a naphthyl group which may be substituted with Z or a thienyl group which may be substituted with Z, in which Z has the same meaning as defined above.

[10] The electrode as recited in any one of 1 to 5 above, wherein $R^6$ represents a group of the following formula (10)

[Chemical Formula 10]

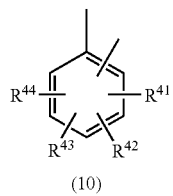

(10)

wherein $R^{41}$-$R^{44}$ independently represent, each substituted on an arbitrary position of the ring of the formula, a hydrogen atom, a halogen atom, a cyano group, a nitro group, an amino group, an epoxy group, a vinyl group, a $C_1$-$C_{10}$ alkyl group, a $C_1$-$C_{10}$ alkoxy group, a phenyl group which may be substituted with Z, a naphthyl group which may be substituted with Z or a thienyl group which may be substituted with Z, in which Z has the same meaning as defined above.

[11] The electrode as recited in any one of 1 to 5 above, wherein $R^6$ represents a group of the following formula (11)

[Chemical Formula 11]

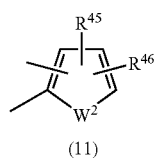

(11)

wherein $R^{45}$-$R^{46}$ independently represent, each substituted on an arbitrary position of the ring of the formula, a hydrogen atom, a halogen atom, a cyano group, a nitro group, an amino group, an epoxy group, a vinyl group, a $C_1$-$C_{10}$ alkyl group, a $C_1$-$C_{10}$ alkoxy group, a phenyl group which may be substituted with Z, a naphthyl group which may be substituted with Z or a thienyl group which may be substituted with Z, in which Z has the same meaning as defined above; and $W^2$ represents NH, O or S.

[12] The electrode as recited in any one of 1 to 5 above, wherein $R^6$ represents a group of the following formula (12)

[Chemical Formula 12]

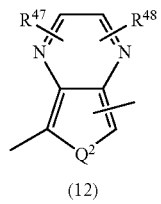

(12)

wherein $R^{47}$-$R^{48}$ independently represent, each substituted on an arbitrary position of the ring of the formula, a hydrogen atom, a halogen atom, a cyano group, a nitro group, an amino group, an epoxy group, a vinyl group, a $C_1$-$C_{10}$ alkyl group, a $C_1$-$C_{10}$ alkoxy group, a phenyl group which may be substituted with Z, a naphthyl group which may be substituted with Z or a thienyl group which may be substituted with Z, in which Z has the same meaning as defined above; and $Q^2$ represents NH, O or S.

[13] The electrode as recited in any one of 1 to 5 above, wherein $R^6$ represents a group of the following formula (13)

[Chemical Formula 13]

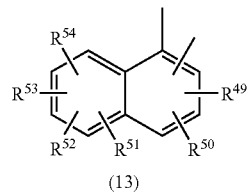

(13)

wherein $R^{49}$-$R^{54}$ independently represent, each substituted on an arbitrary position of the ring of the formula, a hydrogen atom, a halogen atom, a cyano group, a nitro group, an amino group, an epoxy group, a vinyl group, a $C_1$-$C_{10}$ alkyl group, a $C_1$-$C_{10}$ alkoxy group, a phenyl group which may be substituted with Z, a naphthyl group which may be substituted with Z or a thienyl group which may be substituted with Z, in which Z has the same meaning as defined above.

[14] The electrode as recited in 1 above, wherein the group formed by bonding $R^1$ and $R^2$ through a singe bond is represented by the formula (14)

[Chemical Formula 14]

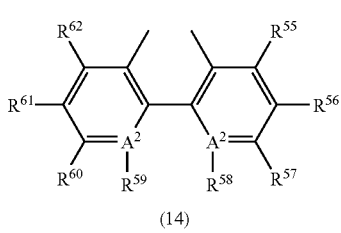

(14)

wherein $A^2$'s are each C or N, $R^{55}$-$R^{62}$ independently represent a hydrogen atom, a halogen atom, a cyano group, a nitro group, an amino group, an epoxy group, a vinyl group, a $C_1$-$C_{10}$ alkyl group, a $C_1$-$C_{10}$ alkoxy group, a phenyl group which may be substituted with Z, a naphthyl group which may be substituted with Z or a thienyl group which may be substituted with Z, in which Z has the same meaning as defined above, provided that when $A^2$ represents N, $R^{58}$ and $R^{59}$ are both non-existent.

[15] An electrode for an energy storage device comprising a polyaminoquinoxaline compound of the following formula (1b) as an electrode active material

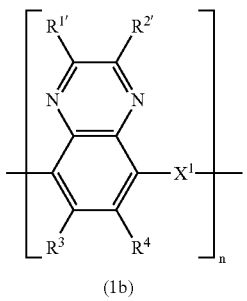

[Chemical Formula 15]

(1b)

wherein $R^{1'}$ and $R^{2'}$ join together to form —CH₂CH₂CH₂—, —CH₂CH₂O—, —OCH₂CH₂—, —CH₂OCH₂—, —OCH₂O—, —CH₂CH₂S—, —SCH₂CH₂—, —CH₂SCH₂—, —CH₂CH₂N(R')—, —N(R')CH₂CH₂—, —CH₂N(R')CH₂—, —CH₂CH₂CH₂CH₂—, —CH₂CH₂CH₂O—, —OCH₂CH₂CH₂—, —CH₂CH₂OCH₂—, —CH₂OCH₂CH₂—, —CH₂OCH₂O—, —OCH₂CH₂O—, —SCH₂CH₂S—, —OCH₂CH₂S—, —SCH₂CH₂O—, —CH₂CH=CH—, —CH=CHCH₂—, —OCH=CH—, —CH=CHO—, —SCH=CH—, —CH=CHS—, —N(R')CH=CH—, —CH=CHN(R')—, —OCH=N—, —N=CHO—, —SCH=N—, —N=CHS—, —N(R')CH=N—, —N=CHN(R')—, —N(R')N=CH—, —CH=N(R')N—, —CH=CHCH=CH—, —OCH₂CH=CH—, —CH=CHCH₂O—, —N=CHCH=CH—, —CH=CHCH=N—, —N=CHCH=N—, —N=CHN=CH—, or —CH=NCH=N— wherein a hydrogen atom bonded to a carbon atom of these groups may be substituted with Y, and R' represents a hydrogen atom, a $C_1$-$C_{10}$ alkyl group, a $C_1$-$C_{10}$ haloalkyl group, a $C_1$-$C_{10}$ cyanoalkyl group, a phenyl group which may be substituted with Z, a pyridyl group which may be substituted with Z, a biphenyl group which may be substituted with Z, a naphthyl group which may be substituted with Z, a thienyl group which may be substituted with Z, a pyrrolyl group which may be substituted with Z, a furyl group which may be substituted with Z, or a condensed heteroaryl group which may be substituted with Z; and $R^3$, $R^4$, $X^1$, Y, Z and n, respectively, have the same meanings defined hereinbefore.

[16] An electrode for an energy storage device including a polyaminoquinoxaline compound of the following formula (1c) as an electrode active material

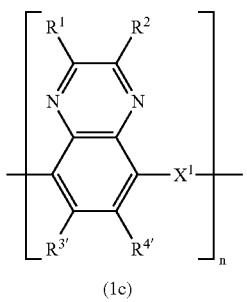

[Chemical Formula 16]

(1c)

wherein $R^{3'}$ and $R^{4'}$ join together to form —CH₂CH₂CH₂—, —CH₂CH₂O—, —OCH₂CH₂—, —CH₂OCH₂—, —OCH₂O—, —CH₂CH₂S—, —SCH₂CH₂—, —CH₂SCH₂—, —CH₂CH₂N(R')—, —N(R')CH₂CH₂—, —CH₂N(R')CH₂—, —CH₂CH₂CH₂CH₂—, —CH₂CH₂CH₂O—, —OCH₂CH₂CH₂—, —CH₂CH₂OCH₂—, —CH₂OCH₂CH₂—, —CH₂OCH₂O—, —OCH₂CH₂O—, —SCH₂CH₂S—, —OCH₂CH₂S—, —SCH₂CH₂O—, —CH₂CH=CH—, —CH=CHCH₂—, —OCH=CH—, —CH=CHO—, —SCH=CH—, —CH=CHS—, —N(R')CH=CH—, —CH=CHN(R')—, —OCH=N—, —N=CHO—, —SCH=N—, —N=CHS—, —N(R')CH=N—, —N=CHN(R')—, —N(R')N=CH—, —CH=N(R')N—, —CH=CHCH=CH—, —OCH₂CH=CH—, —CH=CHCH₂O—, —N=CHCH=CH—, —CH=CHCH=N—, —N=CHCH=N—, —N=CHN=CH—, or —CH=NCH=N— wherein a hydrogen atom bonded to a carbon atom of these groups may be substituted with Y; and $R^1$, $R^2$, R', $X^1$, Y, Z and n, respectively, have the same meanings as defined hereinbefore.

[17] An electrode for an energy storage device including a polyaminoquinoxaline compound of the following formula (1d) as an electrode active material

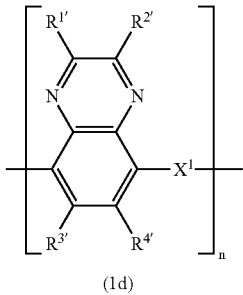

[Chemical Formula 17]

(1d)

wherein $R^{1'}$, $R^{2'}$, $R^{3'}$, $R^{4'}$, $X^1$ and n, respectively, have the same meanings as defined hereinbefore.

[18] The electrode as recited in 15 or 17 above, wherein the group formed by joining $R^{1'}$ and $R^{2'}$ together is of the formula (15)

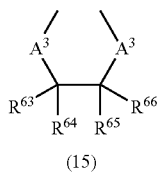

[Chemical Formula 18]

(15)

wherein $A^3$ represents O or S, and $R^{63}$-$R^{66}$ independently represent a hydrogen atom, a halogen atom, a cyano group, a nitro group, an amino group, an epoxy group, a vinyl group, a $C_1$-$C_{10}$ alkyl group, a $C_1$-$C_{10}$ alkoxy group, a phenyl group which may be substituted with Z, a naphthyl group which may be substituted with Z or a thienyl group which may be substituted with Z, in which Z has the same meaning as defined hereinbefore.

[19] The electrode as recited in to 16 or 17 above, wherein the group formed by joining $R^{3'}$ and $R^{4'}$ together is of the formula (16)

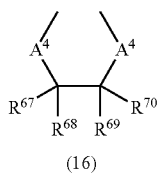

[Chemical Formula 19]

(16)

wherein $A^4$ represents O or S, and $R^{67}$-$R^{70}$ independently represent a hydrogen atom, a halogen atom, a cyano group, a nitro group, an amino group, an epoxy group, a vinyl group, a $C_1$-$C_{10}$ alkyl group, a $C_1$-$C_{10}$ alkoxy group, a phenyl group which may be substituted with Z, a naphthyl group which may be substituted with Z or a thienyl group which may be substituted with Z, in which Z represents a halogen atom, a cyano group, a nitro group, an amino group, an epoxy group, a vinyl group, a $C_1$-$C_{10}$ alkyl group, a $C_1$-$C_{10}$ haloalkyl group, a $C_1$-$C_{10}$ alkoxy group, a $C_1$-$C_{10}$ cyanoalkyl group, a phenyl group, a biphenyl group, a naphthyl group, a thienyl group, a pyrrolyl group, a furyl group or a condensed heteroaryl group.

[20] The electrode as recited in 16 or 17 above, wherein the group formed by joining $R^{3'}$ and $R^{4'}$ is of the formula (17)

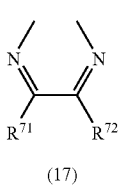

[Chemical Formula 20]

(17)

wherein $R^{71}$ and $R^{72}$ independently represent a hydrogen atom, a halogen atom, a cyano group, a nitro group, an amino group, an epoxy group, a vinyl group, a $C_1$-$C_{10}$ alkyl group, a $C_1$-$C_{10}$ alkoxy group, a phenyl group which may be substituted with Z, a naphthyl group which may be substituted with Z or a thienyl group which may be substituted with Z, in which Z has the same meaning as defined hereinbefore.

[21] An energy storage device comprising an electrode for an energy storage device as recited in any one of 1 to 20 above.

[22] A method for making an electrode for an energy storage device as recited in 1, which method comprising applying and building up, on a current collector electrode, an electrode active material made of a polyaminoquinoxaline compound represented by the afore-indicated formula (1a).

[23] A method for making an electrode for an energy storage device as recited in 15 above, which method comprising applying and building up, on a current collector electrode, an electrode active material made of a polyaminoquinoxaline compound represented by the afore-indicated formula (1b).

[24] A method for making an electrode for an energy storage device as recited in 16 above, which method comprising applying and building up, on a current collector electrode, an electrode active material made of a polyaminoquinoxaline compound represented by the afore-indicated formula (1c).

[25] A method for making an electrode for an energy storage device as recited in 17 above, which method comprising applying and building up, on a current collector electrode, an electrode active material made of a polyaminoquinoxaline compound represented by the afore-indicated formula (1d).

[26] A method for making an electrode for an energy storage device as recited in 1 above, which method comprising forming an aminoquinoxaline compound represented by the formula (18a) by electrolytic polymerization on a current collector electrode

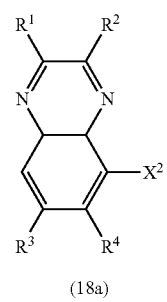

[Chemical Formula 21]

(18a)

wherein $X^2$ represents —NH—$R^{73}$—$NH_2$ or —NH—$R^{74}$, in which $R^{73}$ represents a $C_1$-$C_{10}$ alkylene group, a —C(O)CH$_2$—, —CH$_2$C(O)—, a divalent benzene ring which may be substituted with Y, a divalent pyridine ring which may be substituted with Y, a divalent biphenyl group which may be substituted with Y, a divalent naphthalene ring which may be substituted with Y, a divalent thiophene ring which may be substituted with Y, a divalent pyrrole ring which may be substituted with Y, a furan ring which may be substituted with Y, or a condensed hetero ring which may be substituted with Y, and $R^{74}$ a $C_1$-$C_{10}$ alkyl group, an acetyl group, a phenyl group which may be substituted with Y, a pyridyl group which may be substituted with Y, a biphenyl group which may be substituted with Y, a naphthyl group which may be substituted with Y, a thienyl group which may be substituted with Y, a pyrrolyl group which may be substituted with Y, a furyl group which may be substituted with Y, or a condensed heteroaryl group which may be substituted with Y; and $R^1$, $R^2$, $R^3$, $R^4$ and Y, respectively, have the same meanings as defined hereinbefore.

[27] A method for making an electrode for an energy storage device as recited in 15 above, which method comprising electrolytically polymerizing an aminoquinoxaline compound represented by the formula (18b) on a current collector electrode,

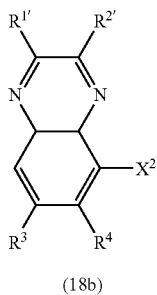

[Chemical Formula 22]

(18b)

wherein $R^{1'}$, $R^{2'}$, $R^3$, $R^4$ and $X^2$, respectively, have the same meanings as defined hereinbefore.

[28] A method for making an electrode for an energy storage device as recited in 16 above, which method comprising electrolytically polymerizing an aminoquinoxaline compound represented by the formula (18c) on a current collector electrode,

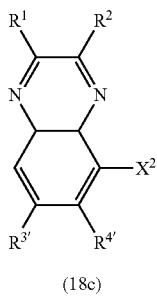

[Chemical Formula 23]

(18c)

wherein $R^1$, $R^2$, $R^{3'}$, $R^{4'}$ and $X^2$, respectively, have the same meanings as defined hereinbefore.

[29] A method for making an electrode for an energy storage device as recited in 17 above, which method comprising electrolytically polymerizing an aminoquinoxaline compound represented by the formula (18d) on a current collector electrode,

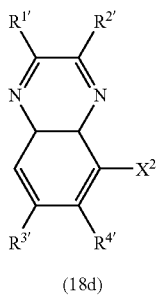

[Chemical Formula 24]

(18d)

wherein $R^{1'}$, $R^{2'}$, $R^{3'}$, $R^{4'}$ and $X^2$, respectively, have the same meanings as defined hereinbefore.

ADVANTAGEOUS EFFECTS OF THE INVENTION

The polyaminoquinoxaline compounds of the formulae (1a) to (1d) used as an electrode active material of an electrode for an energy storage device according to the invention have a good heat resistance and is readily controllable with respect to the electrochemical redox potential thereof involving proton movement, and have good cyclic properties.

Moreover, these polyaminoquinoxaline compounds have an electron donative group and an electron acceptive group in one molecule, and are those conductive polymer compounds which not only can be used as either of a positive electrode or a negative electrode, but also exhibit a wide potential activity.

The device that is arranged as having an electrode for an energy storage device of the invention using a polyaminoquinoxaline compound as an electrode active material ensures storage at high capacitance.

Especially, when the polyaminoquinoxaline compound is used as an electrode for an electric double layer capacitor, the redox reaction of the electrode active material and the electric double layer occurring on the surface of the electrode both function as an energy source, so that storage of a higher capacitance is enabled than in a conventional electric double layer capacitor using active carbon alone.

BEST MODE FOR CARRYING OUT THE INVENTION

The invention is described in more detail below.

The electrode of an energy storage device according to the invention is comprising, as an electrode active material, a polyaminoquinoxaline compound represented by any one of the afore-indicated formulae (1a)-(1d).

Initially, the polyaminoquinoxaline compounds of the formulae (1a)-(1d) or the aminoquinoxaline compounds of the formulae (18a)-(18d) are described.

In these formulae, $R^1$ and $R^2$ independently represent a hydrogen atom, a hydroxyl group, a $C_1$-$C_{10}$ alkyl group, a $C_1$-$C_{10}$ alkoxy group, a phenyl group which may be substituted with Y, a pyridyl group which may be substituted with Y, a biphenyl group which may be substituted with Y, a naphthyl group which may be substituted with Y, a thienyl group which may be substituted with Y, a pyrrolyl group which may be substituted with Y, a furyl group which may be substituted with Y or a condensed heteroaryl group which may be substituted with Y provided that when $R^1$ and $R^2$ are, respectively, the above-defined phenyl, pyridyl, biphenyl, naphthyl, thienyl, pyrrolyl, furyl or condensed heteroaryl group, these groups may be joined through a single bond.

$R^{1'}$ and $R^{2'}$ join together to form —CH$_2$CH$_2$CH$_2$—, —CH$_2$CH$_2$O—, —OCH$_2$CH$_2$—, —CH$_2$OCH$_2$—, —OCH$_2$O—, —CH$_2$CH$_2$S—, —SCH$_2$CH$_2$—, —CH$_2$SCH$_2$—, —CH$_2$CH$_2$N(R')—, —N(R')CH$_2$CH$_2$—, —CH$_2$N(R')CH$_2$—, —CH$_2$CH$_2$CH$_2$CH$_2$—, —CH$_2$CH$_2$CH$_2$O—, —OCH$_2$CH$_2$CH$_2$—, —CH$_2$CH$_2$OCH$_2$—, —CH$_2$OCH$_2$CH$_2$—, —CH$_2$OCH$_2$O—, —OCH$_2$CH$_2$O—, —SCH$_2$CH$_2$S—, —OCH$_2$CH$_2$S—, —SCH$_2$CH$_2$O—, —CH$_2$CH=CH—, —CH=CHCH$_2$—, —OCH=CH—, —CH=CHO—, —SCH=CH—, —CH=CHS—, —N(R')CH=CH—, —CH=CHN(R')—, —OCH=N—, —N=CHO—, —SCH=N—, —N=CHS—, —N(R')CH=N—, —N=CHN(R')—, —N(R')N=CH—, —CH=N(R')N—, —CH=CHCH=CH—, —OCH$_2$CH=CH—, —CH=CHCH$_2$O—, —N=CHCH=CH—, —CH=CHCH=N—, —N=CHCH=N—, —N=CHN=CH—, or —CH=NCH=N— wherein a hydrogen atom bonded to a carbon atom of these groups may be substituted with Y, and R' represents a hydrogen atom, a $C_1$-$C_{10}$ alkyl group, a $C_1$-$C_{10}$ haloalkyl group, a $C_1$-$C_{10}$ cyanoalkyl group, a phenyl group which may be substituted with Z, a pyridyl group which may be substituted with Z, a biphenyl group which may be substituted with Z, a naphthyl group which may be substituted with Z, a thienyl group which may be substituted with Z, a pyrrolyl group which may be substituted with Z, a furyl group which may be substituted with Z, or a condensed heteroaryl group which may be substituted with Z.

More particularly, mention is made of those groups of the following formulae (2) to (5), (14) and (15):

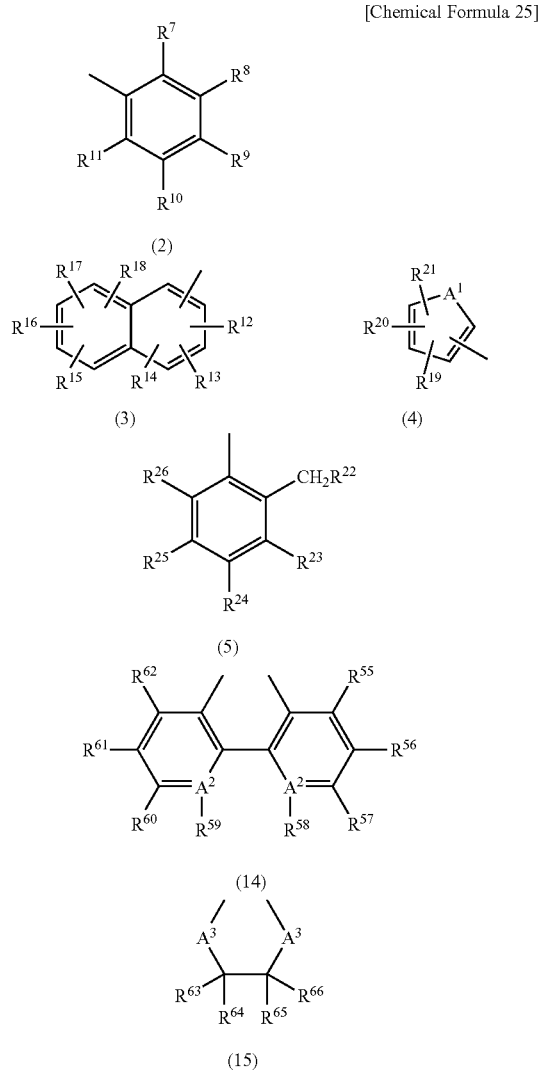

When the solubility of the aminoquinoxaline compound is taken into account, $R^1$, $R^2$, $R^{1'}$ and $R^{2'}$ should preferably be substituted with substituent Y. The substituent Y should preferably be a $C_1$-$C_{10}$ alkyl group or a $C_1$-$C_{10}$ alkoxy group, more preferably a $C_1$-$C_5$ alkyl group or a $C_1$-$C_5$ alkoxy group.

When the electric property of the aminoquinoxaline compound is taken into account, $R^1$ and $R^2$ should preferably be the group represented by the above formula (14) formed by bonding $R^1$ and $R^2$ through a single bond. Especially, $A^2$, in the formula (14), should preferably be carbon atom.

On the other hand, $R^3$ and $R^4$ independently represent a hydrogen atom, a halogen atom, a cyano group, a nitro group, an amino group, a $C_1$-$C_{10}$ alkyl group, a $C_1$-$C_{10}$ alkoxy group, a phenyl group which may be substituted with Y, a pyridyl group which may be substituted with Y, a biphenyl group which may be substituted with Y, a naphthyl group which may be substituted with Y, a thienyl group which may be substituted with Y, a pyrrolyl group which may be substituted with Y, a furyl group which may be substituted with Y or a condensed heteroaryl group which may be substituted with Y provided that when $R^3$ and $R^4$ are, respectively, the above-defined phenyl, pyridyl, biphenyl, naphthyl, thienyl, pyrrolyl, furyl or condensed heteroaryl group, these groups may be joined through a single bond.

$R^3$ and $R^4$ join together to form —CH$_2$CH$_2$CH$_2$—, —CH$_2$CH$_2$O—, —OCH$_2$CH$_2$—, —CH$_2$OCH$_2$—, —OCH$_2$O—, —CH$_2$CH$_2$S—, —SCH$_2$CH$_2$—, —CH$_2$SCH$_2$—, —CH$_2$CH$_2$N(R')—, —N(R')CH$_2$CH$_2$—, —CH$_2$N(R')CH$_2$—, —CH$_2$CH$_2$CH$_2$CH$_2$—, —CH$_2$CH$_2$CH$_2$O—, —OCH$_2$CH$_2$CH$_2$—, —CH$_2$CH$_2$OCH$_2$—, —CH$_2$OCH$_2$CH$_2$—, —CH$_2$OCH$_2$O—, —OCH$_2$CH$_2$O—, —SCH$_2$CH$_2$S—, —OCH$_2$CH$_2$S—, —SCH$_2$CH$_2$O—, —CH$_2$CH=CH—, —CH=CHCH$_2$—, —OCH=CH—, —CH=CHO—, —SCH=CH—, —CH=CHS—, —N(R')CH=CH—, —CH=CHN(R')—, —OCH=N—, —N=CHO—, —SCH=N—, —N=CHS—, —N(R')CH=N—, —N=CHN(R')—, —N(R')N=CH—, —CH=N(R')N—, —CH=CHCH=CH—, —OCH$_2$CH=CH—, —CH=CHCH$_2$O—, —N=CHCH=CH—, —CH=CHCH=N—, —N=CHCH=N—, —N=CHN=CH—, or —CH=NCH=N— wherein a hydrogen atom bonded to a carbon atom of these groups may be substituted with Y, and Z has the same meaning as defined above.

When $R^3$ and $R^4$ are, respectively, an alkyl group or an alkoxy group, these groups should preferably have 1 to 5 carbon atoms from the standpoint of conductivity. In view of providing good redox potential, $R^3$ and $R^4$ should preferably be a phenyl group, a naphthyl group or a thienyl group. From the standpoint of electric characteristics, $R^3$, $R^4$, $R^{3'}$, and $R^{4'}$ should preferably be substituted with substituent Y. Such a substituent Y preferably includes, a $C_1$-$C_{10}$ alkyl group or a $C_1$-$C_{10}$ alkoxy group, more preferably a $C_1$-$C_5$ alkyl group or a $C_1$-$C_5$ alkoxy group. Specific examples include, aside from those groups of the formulae (2) to (5) and (14) exemplified with respect to the $R^1$, $R^2$, $R^{1'}$ and $R^{2'}$ the groups of the following formulae (16) and (17).

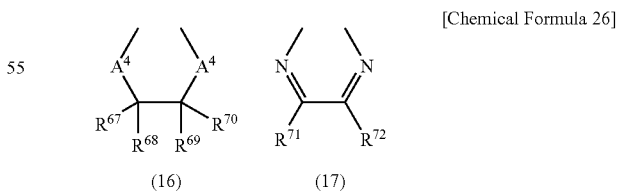

In the formulae (1a)-(1d), $X^1$ represents —NH—$R^5$—NH— or —NH—$R^6$— wherein $R^5$ and $R^6$ independently represent a $C_1$-$C_{10}$ alkylene group, —C(O)CH$_2$—, —CH$_2$C(O)—, a divalent benzene ring which may be substituted with Y, a divalent pyridine ring which may be substituted with Y, a divalent biphenyl group which may be substituted with Y, a divalent naphthalene ring which may be substituted with Y, a divalent thiophene ring which may be substituted with Y, a pyrrole ring which may be substituted with Y, a furan ring which may be substituted with Y, or a condensed hetero ring which may be substituted with Y. Specific examples are those groups of the following formulae (6) to (13):

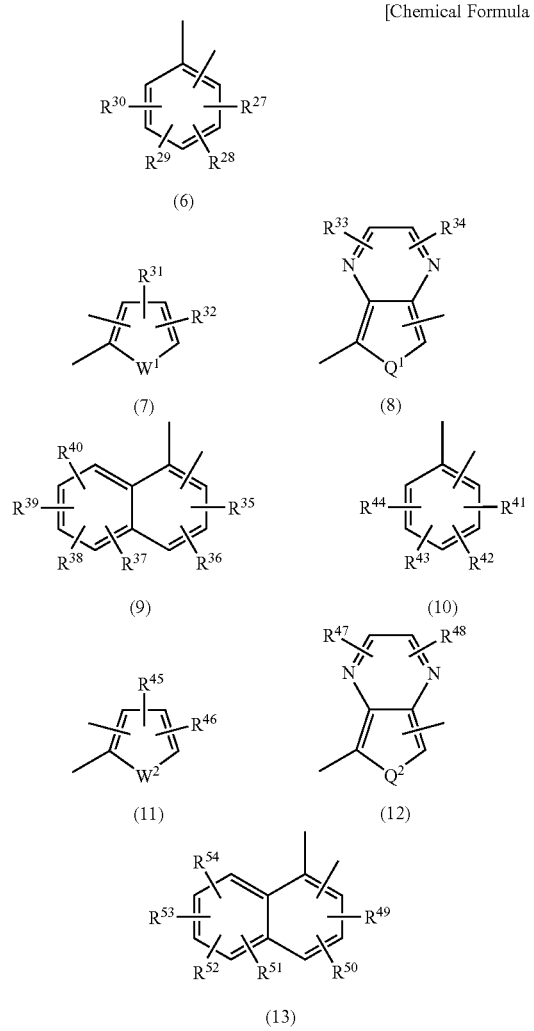

In the afore-indicated formulae (18a)-(18d), $X^2$ represents —NH—$R^{73}$—$NH_2$ or —NH—$R^{74}$ wherein $R^{73}$ a $C_1$-$C_{10}$ alkylene group, —C(O)—$CH_2$—, —$CH_2$C(O)—, a divalent benzene ring which may be substituted with Y, a divalent pyridine ring which may be substituted with Y, a divalent biphenyl group which may be substituted with Y, a divalent naphthalene ring which may be substituted with Y, a divalent thiophene ring which may be substituted with Y, a pyrrole ring which may be substituted with Y, a furan ring which may be substituted with Y, or a condensed hetero ring which may be substituted with Y, and $R^{74}$ represents a $C_1$-$C_{10}$ alkyl group, an acetyl group, a phenyl group which may be substituted with Y, a pyridyl group which may be substituted with Y, a biphenyl group which may be substituted with Y, a naphthyl which may be substituted with Y, a thienyl group which may be substituted with Y, a pyrrolyl group which may be substituted with Y, a furyl group which may be substituted with Y, or a condensed heteroaryl which may be substituted with Y.

From the standpoint of providing good redox potential, $R^5$, $R^{73}$ and $R^{74}$ should preferably be a divalent benzene ring, a divalent naphthalene ring or a divalent thiophene ring, respectively. In view of keeping stable electric characteristics such as of a film of a polyaminoquinoxaline compound, these cyclic substituents should preferably be substituted further with substituent Y, respectively.

From the standpoint of providing good redox potential, $R^6$ should preferably be a phenyl group, a naphthyl group or thienyl group.

In view of keeping stable amorphousness such as of a film made of a polyaminoquinoxaline compound, $R^5$, $R^6$, $R^{73}$ and $R^{74}$ should preferably be substituted further with substituent Y, respectively. In this case, the substituent Y should preferably include a $C_1$-$C_{10}$ alkyl group or a $C_1$-$C_{10}$ alkoxy group, more preferably a $C_1$-$C_5$ alkyl group or a $C_1$-$C_5$ alkoxy group.

Although the molecular weight of the polyaminoquinoxaline compound represented by the formula (1) is not critical, the weight average molecular weight preferably ranges 1,000 to 100,000, more preferably 4,000 to 50,000. In view of this, although n in the formula (1) is a positive integer of 2 or more, n is preferably an integer sufficient to ensure the above-defined range of the weight average molecular weight, e.g., n=2 to 400.

In the above-indicated, respective formulae, the $C_1$-$C_{10}$ alkyl group may be linear, branched or cyclic and includes, for example, methyl, ethyl, n-propyl, i-propyl, n-butyl, i-butyl, t-butyl, s-butyl, n-pentyl, n-hexyl, 2-ethylpropyl, 2,2-dimethylpropyl, 1,2-dimethylpropyl, 1,1,2-trimethylpropyl, 1,2,2-trimethylpropyl, 1-ethyl-1-methylropyl, 1-ethyl-2-methylpropyl, 1-methylbutyl, 2-methylbutyl, 3-methylbutyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1-methylpentyl, 2-methylpentyl, 3-methylpentyl, 4-methylpentyl and the like. It will be noted that for the $C_1$-$C_{10}$ alkylene groups, mention is made of those groups wherein one hydrogen atom is eliminated from the above-indicated alkyl groups.

For the $C_1$-$C_{10}$ haloalkyl groups, those groups wherein at least one hydrogen atom of the above-indicated alkyl groups is substituted with a halogen atom are mentioned. It should be noted that the halogen atom may be any of chlorine, bromine, iodine and fluorine atoms.

For the $C_1$-$C_{10}$ cyanoalkyl groups, those groups wherein at least one hydrogen atom of the above-indicated alkyl groups is substituted with a cyano group are mentioned.

For the condensed heteroaryl group, mention is made of thieno[3,4-b]pyrazin-5-yl, furo[3,4-b]pyrazin-5-yl, 6H-pyrolo[3,4-b]pyrazin-5-yl, and the like.

The $C_1$-$C_{10}$ alkoxy groups may be linear, branched or cyclic and include, for example, methoxy, ethoxy, n-propoxy, i-propoxy, n-butoxy, i-butoxy, s-butoxy, t-butoxy, n-pentyloxy, n-hexyloxy, 1,1-dimethylpropoxy, 1,2-dimethylpropoxy, 2,2-dimethylpropoxy, 1-ethylpropoxy, 1,1,2-trimethylpropoxy, 1,2,2-trimethylpropoxy, 1-ethyl-1-methylpropoxy, 1-ethyl-2-methylpropoxy, 1-methylbutoxy, 2-methylbutoxy, 3-methylbutoxy, 1-ethylbutoxy, 2-ethylbutoxy, 1,1-dimethylbutoxy, 1,2-dimethylbutoxy, 1,3-dimethylbutoxy, 2,2-dimethylbutoxy, 2,3-dimethylbutoxy, 3,3-dimethylbutoxy, 1-methylpentyloxy, 2-methylpentyloxy, 3-methylpentyloxy, 4-methylpentyloxy and the like.

In the above-indicated groups, "n", "i", "s", and "t", respectively, mean normal, iso, secondary and tertiary.

Examples of the compounds indicated by the formula (1a) to (1d) include those indicated below although not limitative.

[Chemical Formula 28]
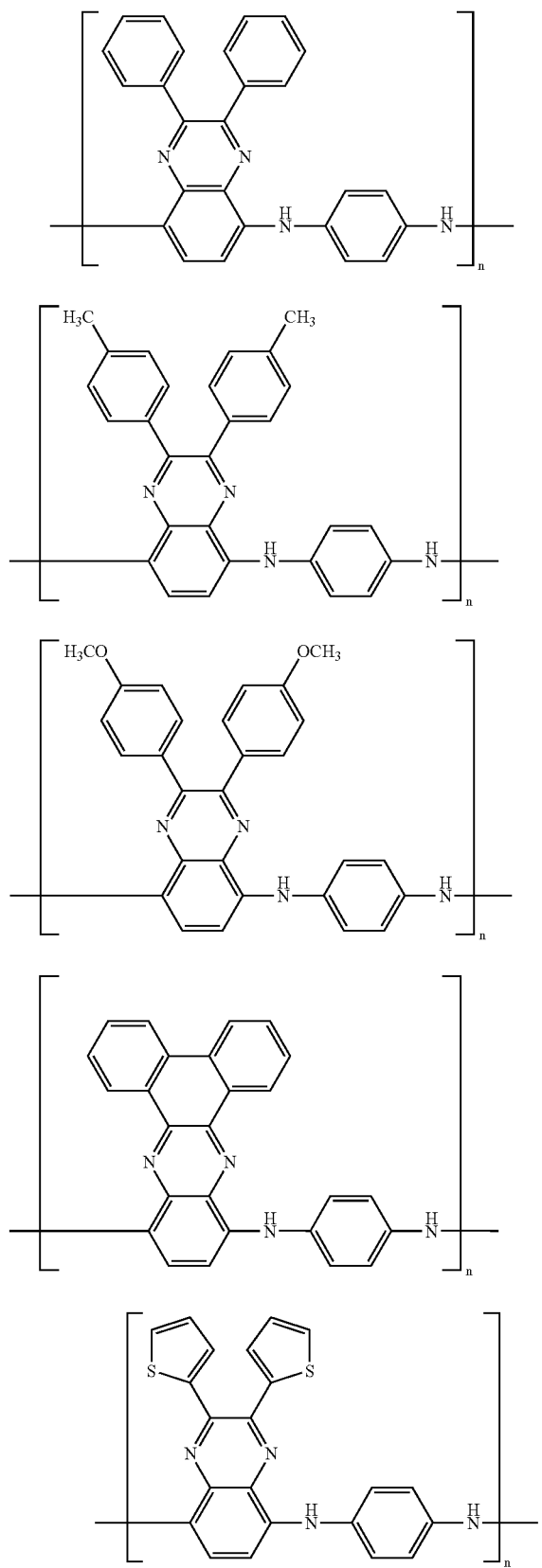
[Chemical Formula 29]
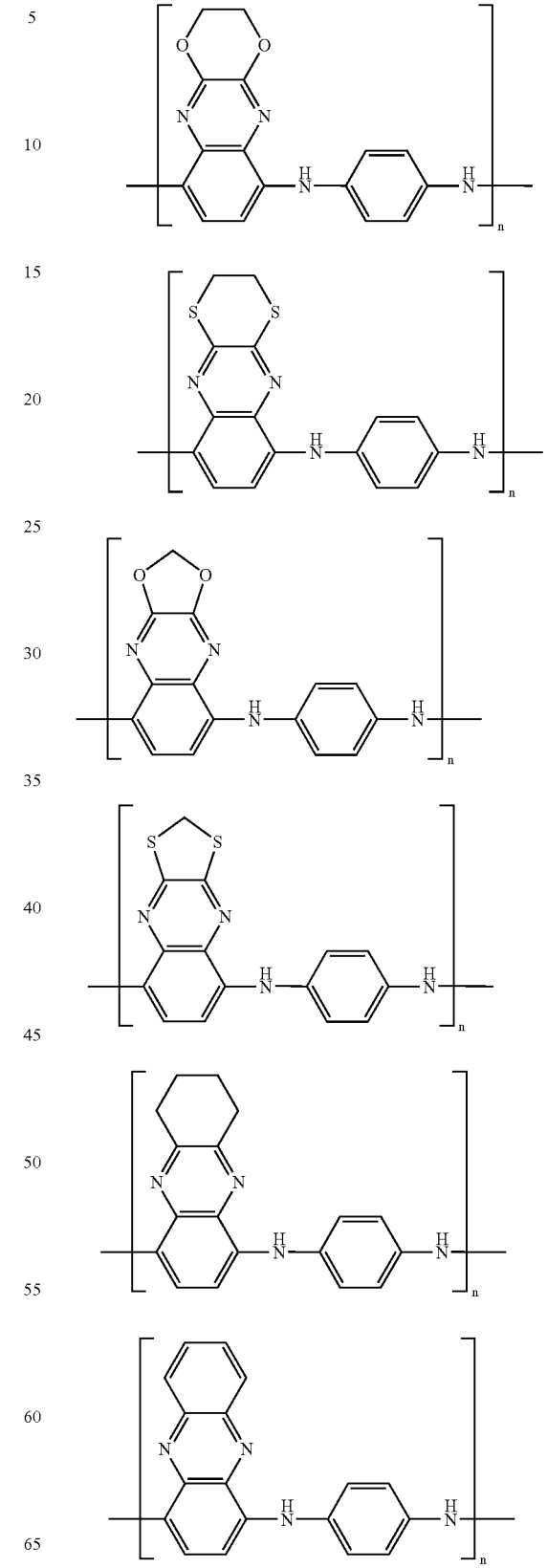

-continued
[Chemical Formula 30]
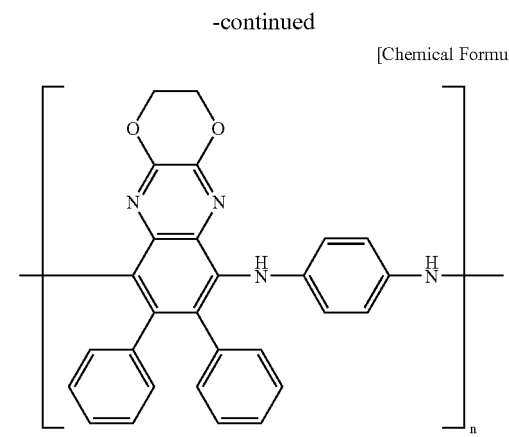
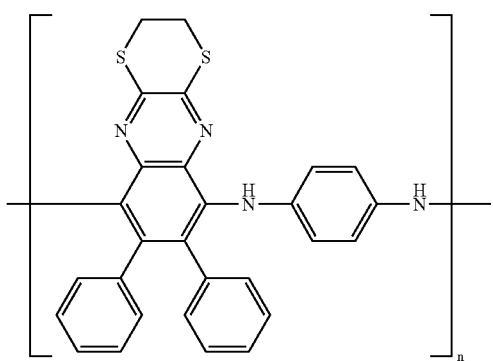
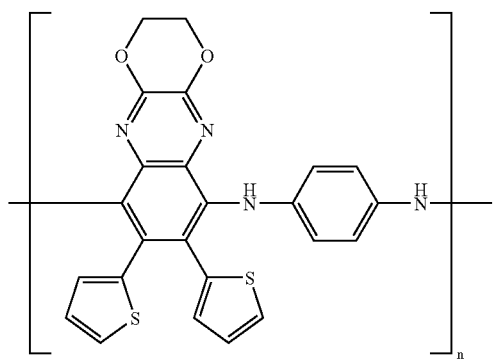
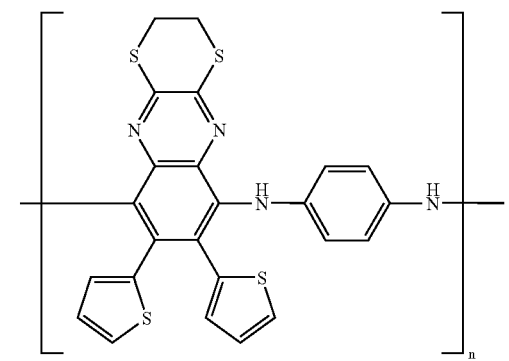
-continued
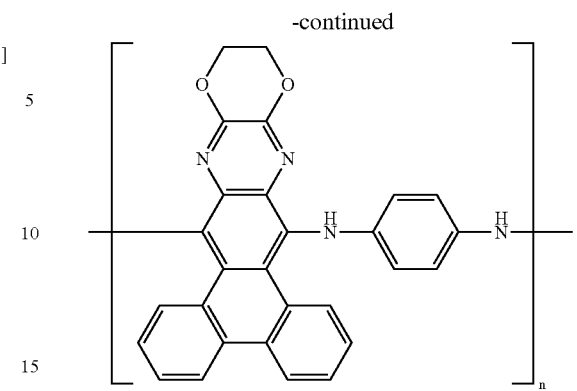
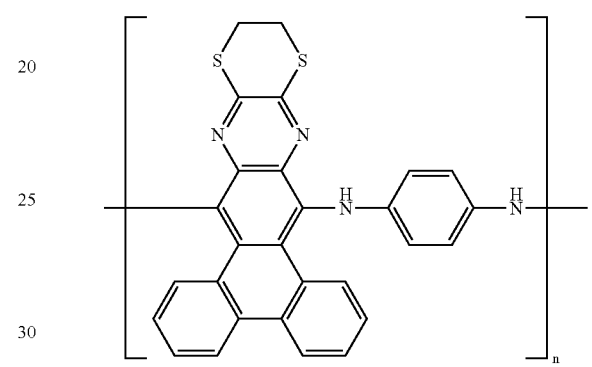
[Chemical Formula 31]
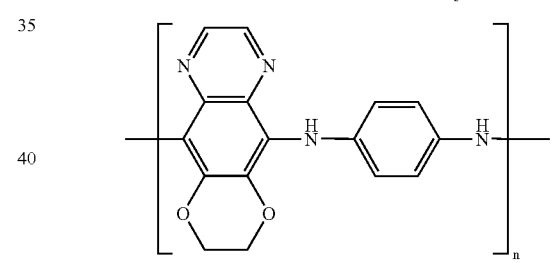
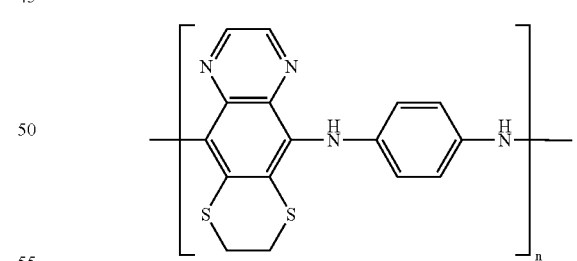
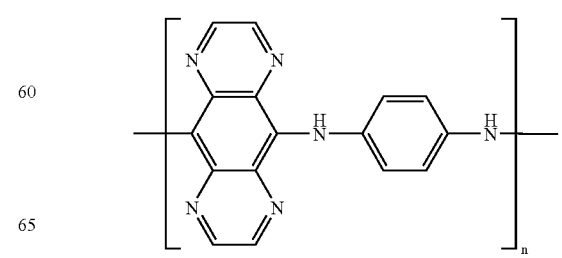

[Chemical Formula 32]
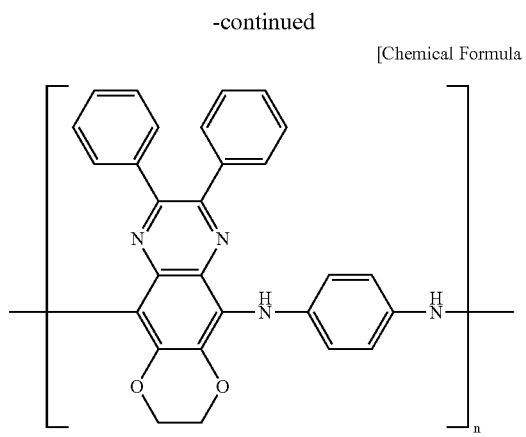
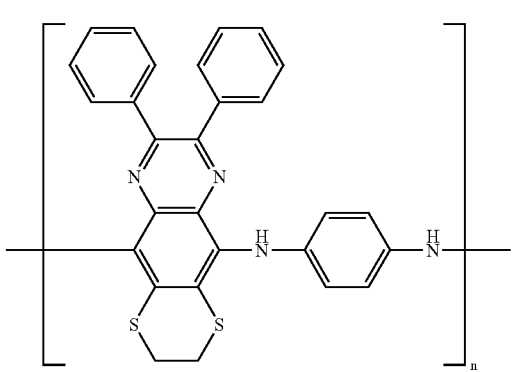
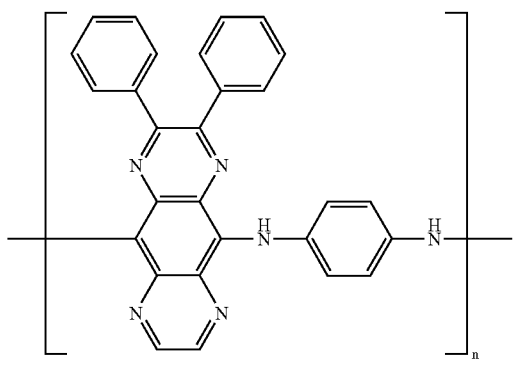
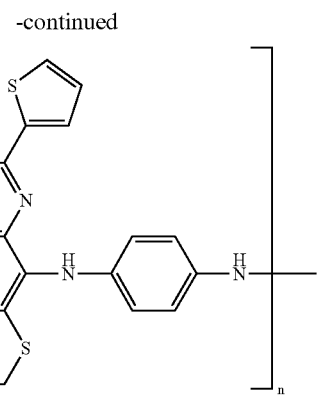
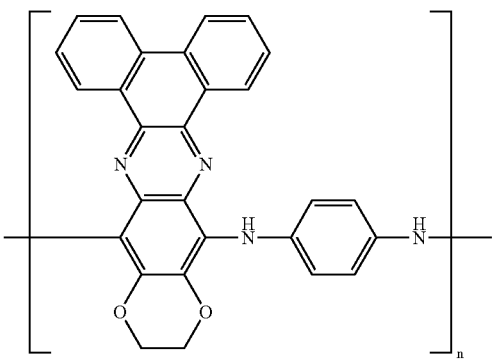
[Chemical Formula 33]
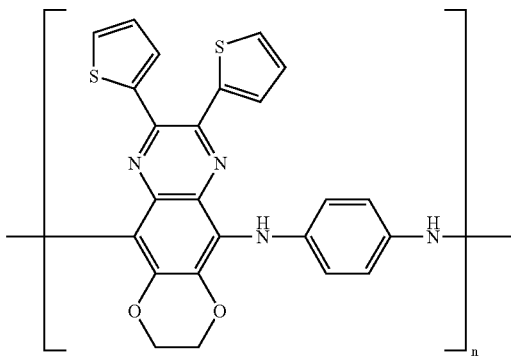

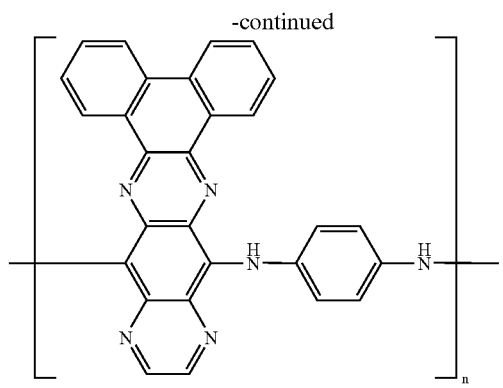

Next, the process of synthesizing, for example, a compound represented the formula (18a) (formula (1a)) selected among those compounds of the formulae (18a)-(18d) (formulae (1a)-(1d)) is described. This compound can be prepared from a starting 5-aminoquinoxaline compound represented by the following formula (19)

[Chemical Formula 34]

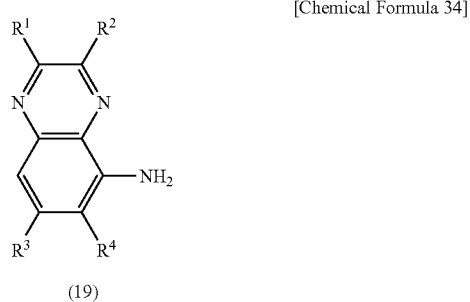

(19)

wherein $R^1$-$R^4$, respectively, have the same meanings as defined in the formula (1a).

Although limitation is not placed on a specific manner of synthesis, there may be used processes set forth in Journal of the Chemical Society Perkin Transactions I (J. Chem. Soc. Perkin Trans. I) 1988, pp. 1331 to 1335, and also in Chemistry Letters (Chem. Lett.) 1997, pp. 1185 to 1186.

For example, a corresponding 5-aminoquinoxaline compound is dissolved in an appropriate solvent and is reacted with nitrofluorobenzene in the presence of an appropriate base at room temperature, followed by hydrogenation reaction in the presence of Pd/C to obtain an intended product wherein a phenyl ring has been introduced at the position of $R^5$. An intended compound having a thienyl group at $R^6$ can be prepared by dissolving a 5-aminoquinoxaline compound in an appropriate solvent, adding catalytic amounts of $Pd_2(dba)_3$ and BINAP and reacting with 2-bromothiophene in the presence of an appropriate base.

It will be noted that the synthesis of the 5-aminoquinoxaline compound of the above formula (19) is not limitative, there can be used a method set out, for example, in Journal of American Chemical Society (J. Am. Chem. Soc.), 1957, Vol. 79, pp. 2245 to 2248, and Journal of Organic Chemistry (J. Org. Chem.), 1966, Vol. 31, pp. 3384 to 3390.

Although a process for preparing a polyaminoquinoxaline compound represented by the formula (1a) is not limitative, this polymer compound can be prepared by polymerizing an aminoquinoxaline compound of the formula (18a) by any arbitrary procedure. Such polymerizing procedures may include, for example, chemical oxidation polymerization, electrolytic oxidation polymerization, catalytic polymerization and the like. In most cases, in view of the fact that a polymer can be formed on an electrode surface, chemical oxidation polymerization and electrolytic oxidation polymerization are preferred, of which the electrolytic oxidation polymerization is more preferred.

The oxidizing agent used for the chemical oxidation polymerization is not critical and includes, for example, ammonium persulfate, tetraammonium peroxide, iron chloride, cerium sulfate and the like.

A specific procedure for the electrolytic oxidation polymerization is as follows: an oxidizing agent is added, for example, to a monomer of the formula (18a) and well agitated, to which an organic solvent is added thereto so as to make a uniform solution; and the resulting solution is subjected to electrolytic polymerization by use of a three-electrode beaker-shaped cell equipped with a platinum mesh counter electrode and the like.

The electrolytic polymerization is carried out, for example, according to an electrochemical measuring system using, as a test electrode substrate, a platinum plate whose surface is abraded with an emery paper and, as a reference electrode, $Ag/Ag^+$. For a more specific procedure of electrolytic polymerization, a potential scanning process and a constant potential process may be used, for example. In this way, an intended polymer compound is obtained as deposited on the electrode in the form of a film.

The oxidizing agents used for the electrolytic oxidation polymerization include, for example, hydrochloric acid, sulfuric acid, perchloric acid, trifluoromethanesulfonic acid, para-toluenesulfonic acid and the like, of which perchloric acid is preferred.

Examples of the organic solvents include N,N-dimethylformamide, tetrahydrofuran, acetonitrile, dichloromethane, dimethylsulfoxide, methanol, ethanol and the like, of which N,N-dimethylformamide is preferred.

While making use of their good characteristics, the polyaminoquinoxaline compounds represented by the formulae (1a)-(1d) illustrated hereinbefore are conveniently applicable to as an active material of an energy storage device, particularly, as an electrode active material. In this connection, the polyaminoquinoxaline per se is conductive in nature and an effect of lowering a contact resistance at an electrode interface can be expected.

The procedure of making an electrode for an energy storage device using the polyaminoquinoxaline compounds represented by the formulae (1a)-(1d) is not critical. The monomer of any one of the foregoing formulae (18a)-(18d) is subjected to electrolytic oxidation polymerization on an electrode to deposit a film of a polymer compound of any one of the formulae (1a)-(1d), thereby making the electrode.

Further, the polyaminoquinoxaline compound can be readily converted to a film according to a vacuum deposition method, a spin coating method, a dipping method, a casting method, a screen printing method or the like. Using these methods, an electrode can be made by coverage with a polyaminoquinoxaline compound-containing film.

Especially, an electrode containing a polyaminoquinoxaline compound as an electrode active material can be readily made by use of a method wherein a coating composition containing an electrode active material made of a polyaminoquinoxaline compound represented by any one of the formulae (1a) to (1d), and coating and built up on a current collector electrode.

The components of the coating composition containing a polyaminoquinoxaline compound are not limitative. For instance, a composition comprising a polyaminoquinoxaline compound, a polymer material for improving film-forming properties, a dispersant and the like. The content of the polyaminoquinoxaline compound is, for example, in the range of about 50 to about 90 wt %.

It will be noted that, if necessary, additives such as thermal stabilizers, light stabilizers, fillers, reinforcing agents and the like may be appropriately formulates.

With the electrode for an energy storage device stated hereinbefore, only an embodiment where an electrode active material made of a polyaminoquinoxaline compound is deposited on an electrode surface such as by electrolytic polymerization or coating has been set forth, to which the invention is not limited. For instance, an electrode composition made by mixing with an electrode active material of a polyaminoquinoxaline compound beforehand is used to make an electrode.

The electrode for energy storage devices can be favorably used in various types of energy storage devices such as electric double layer capacitors, lithium ion cells, proton polymer cells, nickel hydrogen cells, lead batteries and the like. It is preferred to use the electrode for electric double layer capacitors, lithium ion cells, and proton polymer cells.

Especially, when the electrode is used for an electric double layer capacitor, both the redox reaction of the electrode active material and the electric double layer occurring on the electrode surfaces can be used as an energy source, so that storage at a higher capacitance is enabled than with the case of a conventional electric double layer capacitor using active carbon.

EXAMPLES

The invention is more particularly described by way of Synthetic Examples and Examples, which should not be construed as limiting the invention thereto. Comparative Examples are also described.

Synthetic Example 1

Synthesis of 2,3-dihydroxy-5-aminoquinoxaline

Prepared according to the following procedures (1) to (3).

(1) Synthesis of 2,3-diaminonitrobenzene

[Chemical Formula 35]

14 g of commercially available 1-amino-2,5-dinitrobenzene was dissolved in 225 ml of methanol, to which a solution of 60 g of sodium sulfide and 21 g of sodium hydrogen carbonate dissolved in 240 g of water was added by use of a dropping funnel while keeping the reaction temperature at 60° C. After completion of the addition, agitation was continued at 60° C. for 1 hour. After completion of the reaction, the mixture was cooled down to room temperature and filtered.

m/z: (FD+) 153 (calculated 153.1396)

$^1$H-NMR: 7.7228, 7.7203, 7.7206, 7.2433, 6.9245, 6.6209, 6.6063, 6.6038, 6.5886, 5.9210, 3.3978 ppm Yield: 7.79 g (66.5%)

Product aspect: Reddish brown fine crystals

Melting point: 140° C.

(2) Synthesis of 2,3-dihydroxy-5-nitroquinoxaline

[Chemical Formula 36]

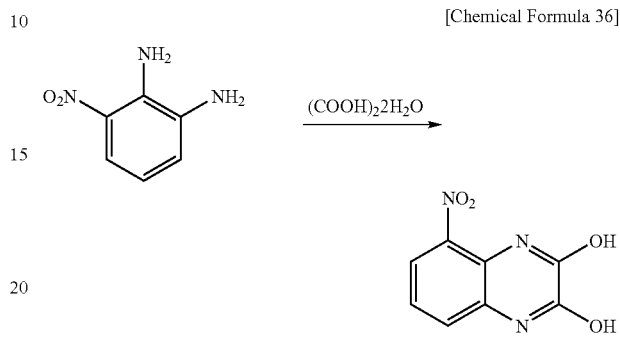

4 g (26.12 mmol) of 2,3-diaminonitrobenzene and 6.59 g (52.24 mmol) of commercially available oxalic dehydrate were dissolved in 50% acetic acid, followed by reaction at a boiling point thereof for 3 hours in a stream of argon. After completion of the reaction, the mixture was cooled down to room temperature and the resulting precipitated crystals were filtered.

Yield: 3.01 g (55.6%)

Product aspect: Yellow fine crystals m/z: 207 (calculated 207.144)

(3) Synthesis of 2,3-dihydroxy-5-aminoquinoxaline

[Chemical Formula 37]

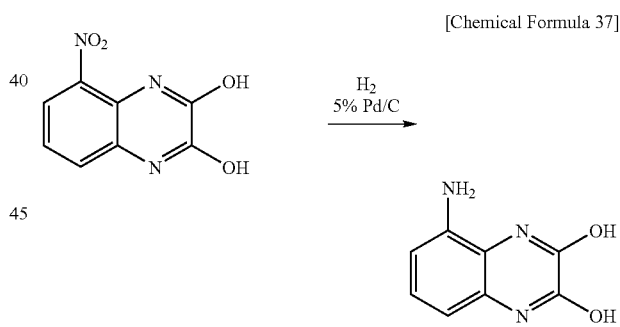

2.00 g of 2,3-dihydroxy-5-nitroquinoxaline was dissolved in 100 g of a 1:1 methanol and dioxane solvent, after which the reaction system was well purged with argon, followed by further addition of 1.00 g of 5% Pd/C (hydrous). Thereafter, the system was purged with hydrogen, followed by reaction at room temperature for 20 hours. After completion of the reaction, the reaction product was dispersed in a solution of 6.00 g of potassium carbonate in 130 ml of water and then dissolved therein. 35% hydrochloric acid was gradually added to the solution obtained after filtration thereby obtaining a precipitate.

Yield: 1.10 g

Product aspect: Light yellow fine crystals m/z: (FD+) 177 (calculated 177.1616)

$^{13}$C-NMR: 155.8030, 155.6504, 135.9570, 126.8390, 124.1303, 112.3265, 109.6025, 103.8418 ppm

Synthetic Example 2

Synthesis of 2,3-diphenyl-5-aminoquinoxaline

Prepared according to the following procedures (1) and (2).

(1) Synthesis of 2,3-diphenyl-5-aminoquinoxaline

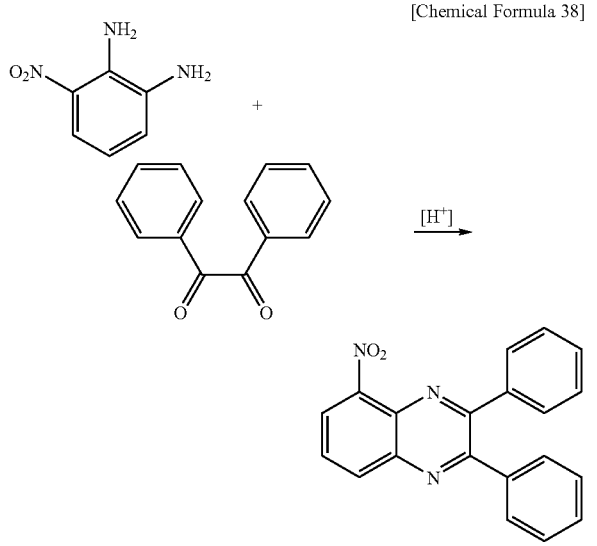

[Chemical Formula 38]

1.53 g (10 mmol) of 2,3-diaminonitrobenzene and 2.00 g (9.6 mmol) of benzil were placed in four-necked flask, to which 30 g of a solvent of acetic acid and methanol at a mixing ratio of 1:1 was added for dissolution. Subsequently, the mixture was reacted at a reaction temperature of 70° C. for 2 hours. After the reaction, the solvent was removed and the resulting product was extracted with a silica gel column (ethyl acetate:hexane=1:1).

Yield: 2.11 g
Product aspect: Yellow fine crystals
m/z: 327 (calculated 327.24)

(2) Synthesis of 2,3-diphenyl-5-aminoquinoxaline

[Chemical Formula 39]

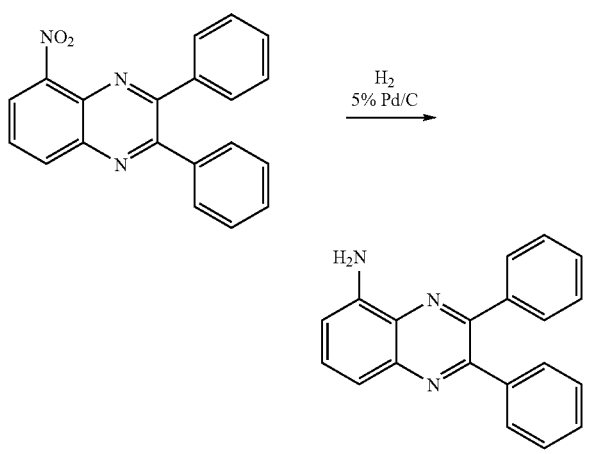

1.04 g of 2,3-diphenyl-5-nitroquinoxaline was dissolved in 30 g of dioxane, followed by purging with argon and further addition of 0.5 g of 5% Pd/C (hydrous). After sufficient purging with argon again, hydrogen was added and reacted at room temperature for 30 hours. After completion of the reaction, the reaction mixture was filtered and the solvent was removed, followed by isolation and purification with a silica gel column (ethyl acetate:hexane=1:3).

Yield: 0.73 g
Product aspect: Yellow fine crystals
m/z: 297 (calculated M: 297.36)
$^{13}$C-NMR: 153.6055, 150.1185, 144.2280, 141.9619, 139.4516, 139.3524, 131.1348, 130.0894, 129.9368, 128.7694, 128.6473, 128.3497, 128.1743, 117.2098, 110.2511 ppm

Synthetic Example 3

Synthesis of 2,3-di(4-methylphenyl)-5-aminoquinoxaline

Prepared according to the following procedures (1) and (2).

(1) Synthesis of 2,3-di(4-methylphenyl)-5-nitroquinoxaline

[Chemical Formula 40]

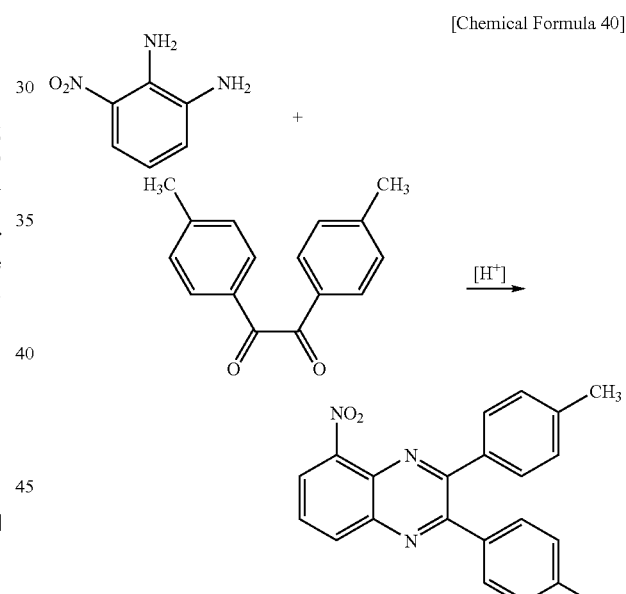

1.84 g (12 mmol) of 2,3-diaminonitrobenzene and 2.38 g (10 mmol) of 4,4'-dimethylbenzil were dissolved in 40 g of a mixed solvent of acetic acid and methanol (1:1) and reacted at a reaction temperature of 80° C. for 4 hours. After completion of the reaction, the solvent was removed and the resulting reaction product was extracted by means of a silica gel column.

Yield: 1.30 g
Product aspect: Yellow fine crystals
m/z: 355 (calculated 355.39)
$^{13}$C-NMR: 154.8950, 154.8339, 147.0894, 140.7563, 140.1307, 139.8636, 135.5984, 135.1253, 133.7061, 133.2254, 130.2725, 129.7003, 129.3188, 129.1204, 128.4108, 127.7470, 124.2142 ppm (2) Synthesis of 2,3-di(4-methylphenyl)-5-aminoquinoxaline

[Chemical Formula 41]

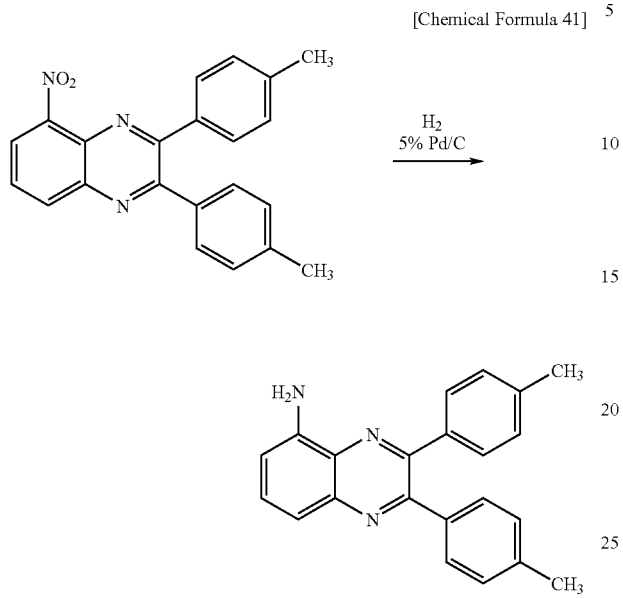

2.02 g of 2,3-di(4-methylphenyl)-5-nitroquinoxaline was dissolved in 30 g of dioxane, followed by purging with argon and adding 0.6 g of 5% Pd/C (hydrous). After purging with argon again, the system was purged with hydrogen for reaction at room temperature for 18 hours. After completion of the reaction, the system was filtered. The filtration residue was washed with acetone and then with dioxane and filtered again. The solvent was removed from the resulting filtrate, followed by extracting a reaction product by use of a silica gel column.

Yield: 1.36 g

Product aspect: Yellow fine crystals m/z: 325 (calculated 325.14)

$^{13}$C-NMR: 153.6131, 150.1643, 144.0907, 141.8551, 138.6581, 138.5894, 136.7074, 136.6666, 131.2721, 130.7761, 129.9292, 129.7766, 129.0365, 128.9815, 117.2403, 110.0603 ppm Synthetic Example 4

Synthesis of 2,3-di(4-methoxyphenyl)-5-aminoquinoxaline

Prepared according to the following procedures (1) and (2).

(1) Synthesis of 2,3-(4-dimethoxyphenyl)-5-nitroquinoxaline

[Chemical Formula 42]

+

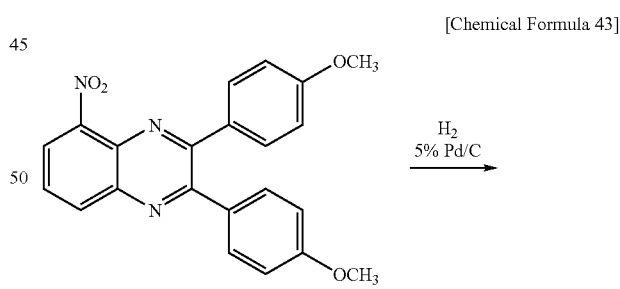

1.54 g (10 mmol) of 2,3-diaminonitrobenzene and 2.25 g (8.3 mmol) of 4,4'-dimethoxybenzil were dissolved in 100 g of a mixed solvent (acetic acid:methanol=1:1) and reacted at room temperature for 20 hours, and, after completion of the reaction, filtered. The resulting filtration residue was washed with acetone and dioxane, and again filtered. The solvent was removed from the resulting filtrate, and a reaction product was extracted by means of a silica gel column.

Yield: 1.24 g

Product aspect: Yellow fine crystals m/z: 387 (calculated: 387.39)

$^{13}$C-NMR: 161.0983, 160.9075, 154.3303, 154.2464, 146.9520, 140.6495, 133.5993, 133.1415, 131.9207, 130.8448, 130.4099, 127.5104, 124.0998, 114.1043, 113.8830 ppm (2) Synthesis of 2,3-di(4-methoxyphenyl)-5-aminoquinoxaline

[Chemical Formula 43]

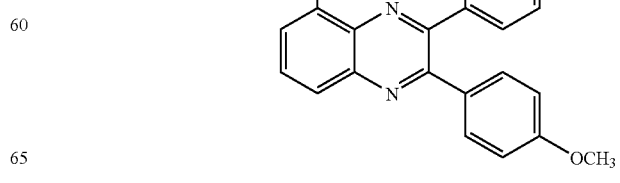

0.55 g of 2,3-(4-dimethoxyphenyl)-5-nitroquinoxaline was dissolved in 30 g of dioxane, followed by purging well with argon, adding 0.5 g of 5% Pd/C (hydrous) and purging satisfactorily with argon again. This system was purged with hydrogen and reacted at room temperature for 24 hours. After completion of the reaction, the system was filtered. The resulting filtration residue was washed with acetone and then with dioxane and filtered again. The solvent was removed from the resulting filtrate and a reaction product was extracted with a silica gel column.

Yield: 0.37 g

Product aspect: Yellow fine crystals m/z: 325 (calculated: 325.43)

$^{13}$C-NMR: 160.1369, 160.0606, 153.1324, 149.7370, 144.0144, 141.7483, 131.3942, 131.2874, 130.6235, 117.1640, 113.8296, 113.6618, 110.0145, 55.3828 ppm Synthetic Example 5

Synthesis of 2,3-di(4-bromophenyl)-5-aminoquinoxaline

Prepared according to the following procedures (1) and (2).

(1) Synthesis of 2,3-di(4-bromophenyl)-5-nitroquinoxaline

[Chemical Formula 44]

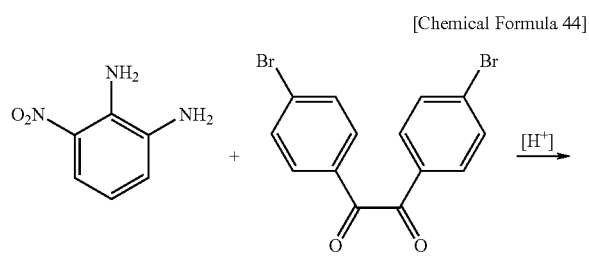

1.53 g (10 mmol) of 2,3-diaminonitrobenzene and 3.68 g (10 mmol) of 4,4'-dibromobenzil were dissolved in 80 g of a mixed solvent of acetic acid and methanol (1:1) and reacted at a reaction temperature of 70° C. for 30 hours. After completion of the reaction, the solvent was removed and a reaction product was extracted by means of a silica gel.

Yield: 1.89 g

Product aspect: Yellow fine crystals m/z: 485 (calculated 485.12)

$^{13}$C-NMR: 153.4453, 153.3613, 147.0065, 140.7945, 136.8116, 136.3766, 133.7824, 133.2635, 132.0504, 131.8749, 131.8215, 131.3789, 128.5787, 124.9849, 124.8780, 124.7102 ppm (2) Synthesis of 2,3-di(4-bromophenyl)-5-aminoquinoxaline

[Chemical Formula 45]

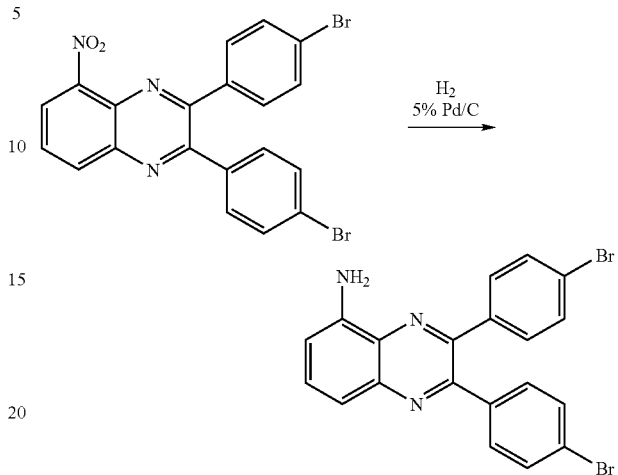

1.01 g (2.1 mmol) of 2,3-di(4-bromophenyl)-5-nitroquinoxaline was dissolved in 30 g of dioxane, followed by purging well with argon, adding 0.3 g of 5% Pd/C (hydrous) and purging well with argon again. This system was purged with a hydrogen gas and reacted at room temperature for 24 hours. After completion of the reaction, the system was filtered. The resulting filtration residue was washed with acetone and then with dioxane and filtered again. The solvent was removed from the resulting filtrate and a reaction product was extracted with a silica gel column.

Yield: 0.66 g

Product aspect: Yellow fine crystals m/z: 455 (calculated: 455.12)

$^{13}$C-NMR: 151.966, 148.493, 144.065, 141.897, 137.920, 137.820, 135.042, 131.706, 131.637, 131.492, 131.400, 131.248, 123.514, 123.377, 117.064, 110.452 ppm Synthetic Example 6

Synthesis of 2,3-dithienyl-5-aminoquinoxaline

Prepared according to the following procedures (1) and (2).

(1) Synthesis of 2,3-dithienyl-5-nitroquinoxaline

[Chemical Formula 46]

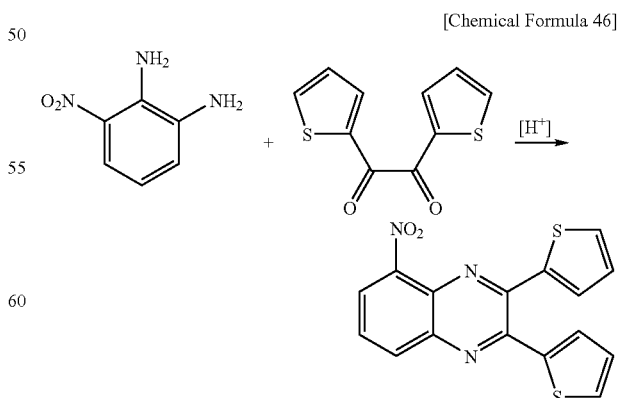

0.022 g (0.144 mmol) of 2,2'-diaminonitrobenzene and 0.01938 g (0.087 mmol) of 2,2'-thienyl were dissolved in 3 g of a mixed solvent of acetic acid and methanol (1:1) and reacted at a reaction temperature of 70° C. for 30 hours. After completion of the reaction, the solvent was removed and the resulting reaction produced was extracted by means of a silica gel column.

Yield: 0.04 g
Product aspect: Yellow fine crystals
m/z: 339 (calculated: 339.40)

(2) Synthesis of 2,3-dithienyl-5-aminoquinoxaline

[Chemical Formula 47]

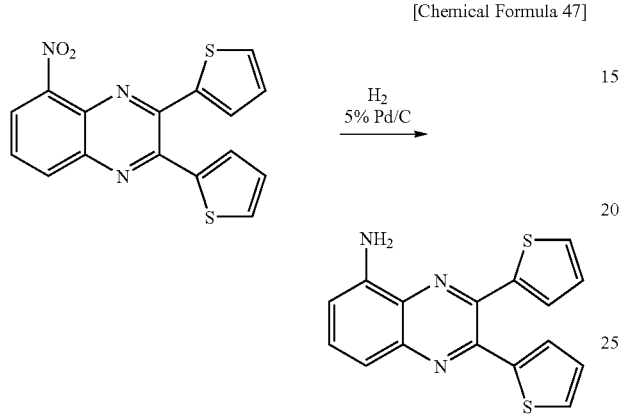

1.01 g (3.0 mmol) of 2,3-dithienyl-5-nitroquinoxaline was dissolved in 30 g of dioxane and the system was fully purged with argon. Thereafter, 0.3 g of 5% Pd/C (hydrous) was added, followed by purging satisfactorily with argon again. This system was purged with a hydrogen gas and reacted at room temperature for 24 hours. After completion of the reaction, the system was filtered. The resulting filtration residue was washed with acetone and then with dioxane, and was filtered again. The solvent was removed from the resulting filtrate, and a reaction product was extracted with a silica gel column.

Yield: 0.40 g
Product aspect: Yellowish brown fine crystals
m/z: 309 (calculated 309.42)
$^{13}$C-NMR: 146.569, 143.752, 142.111, 141.546, 141.233, 131.232, 130.614, 129.064, 128.820, 128.553, 128.469, 127.530, 127.461, 116.911, 116.911, 110.422, 99.902 ppm Synthetic Example 7

Synthesis of 10-aminodibenzo(A,C)phenazine

Prepared according to the following procedures (1) and (2).

(1) Synthesis of 1,2,3-triaminobenzene

[Chemical Formula 48]

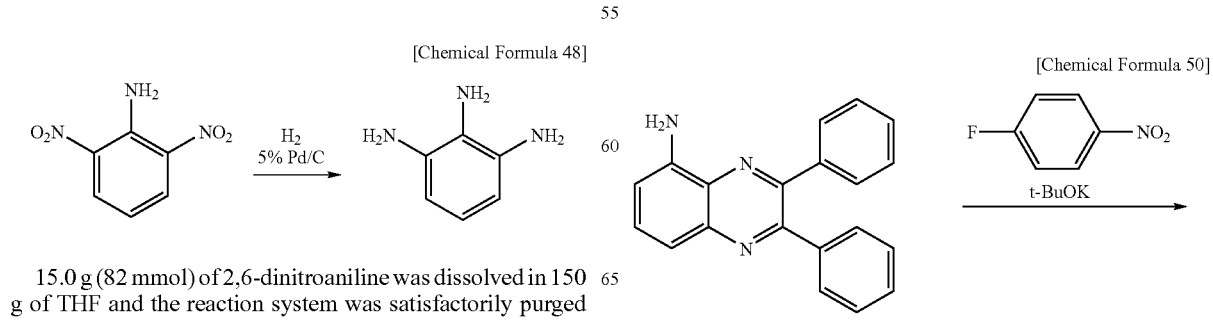

15.0 g (82 mmol) of 2,6-dinitroaniline was dissolved in 150 g of THF and the reaction system was satisfactorily purged with nitrogen, to which 7.6 g of 5% Pd/C (hydrous) was added. Thereafter, the system was purged with hydrogen, followed by reaction at room temperature for 15 hours. After completion of the reaction, the reaction solution was filtered to remove Pd therefrom, and the resulting filtrate was condensed as it is to obtain the intended product. The thus obtained product was instable and was used as it is in a subsequent reaction.

(2) Synthesis of 10-aminodibenzo(A,C)phenazine

[Chemical Formula 49]

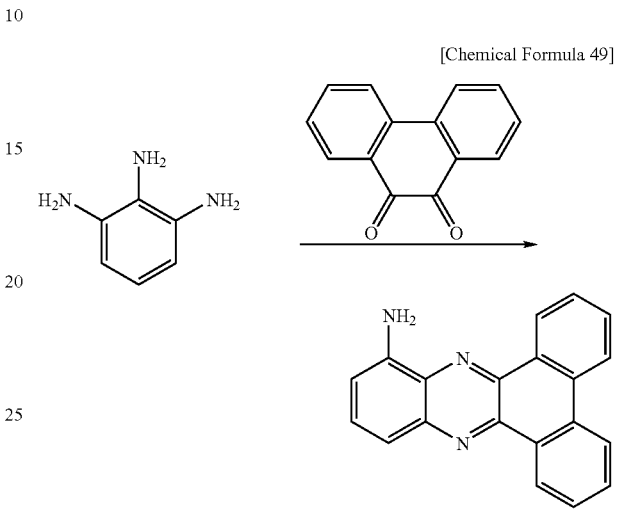

10.1 g (82 mmol) of 1,2,3-triaminobenzene and 14.6 g (70 mmol) of 9,10-phenanthrenequinone were placed in a four-necked flask, to which 350 g of a solvent of acetic acid and methanol at 1:1 was added for dissolution, followed by reaction at a reaction temperature of 70° C. for 2 hours. After the reaction, the solvent was removed and the resulting product was washed with methanol to obtain the intended product.

Yield: 17.1 g
Product aspect: Ocher solid
m/z: 295 (calculated: 295.11)
$^{13}$C-NMR: 146.932, 144.145, 143.084, 139.740, 133.473, 133.007, 132.656, 132.213, 131.602, 131.488, 130.847, 130.473, 128.465, 126.869, 126.831, 126.663, 123.900, 116.243, 108.647 ppm Synthetic Example 8

Synthesis of 2,3-diphenyl-5-(4-aminophenyl)aminoquinoxaline

Prepared according to the following procedures (1) and (2).

(1) Synthesis of 2,3-diphenyl-5-(4-nitrophenyl)aminoquinoxaline

[Chemical Formula 50]

-continued

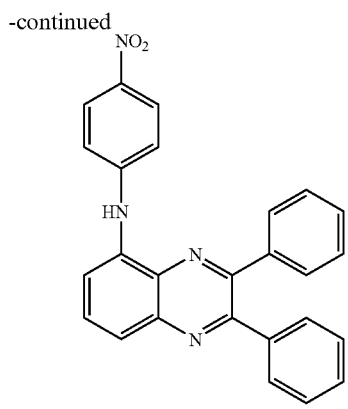

While agitating 4.0 g (13.4 mmol) of 2,3-diphenyl)-5-aminoquinoxaline, 2.1 g (14.9 mmol) of 4-fluoronitrobenzene and 100 ml of dimethylsulfoxide, 5.0 g (44.6 mmol) of t-butoxy potassium was gently added. After completion of the addition, the reaction container was purged with nitrogen, followed by agitation at room temperature for 24 hours. After completion of the reaction, 100 ml of water was added while cooling, and an organic phase was extracted by use of a chloroform solvent, followed by concentration to obtain the intended product.

Yield: 5.4 g (2) Synthesis of 2,3-diphenyl-5-(4-aminophenyl)aminoquinoxaline

[Chemical Formula 51]

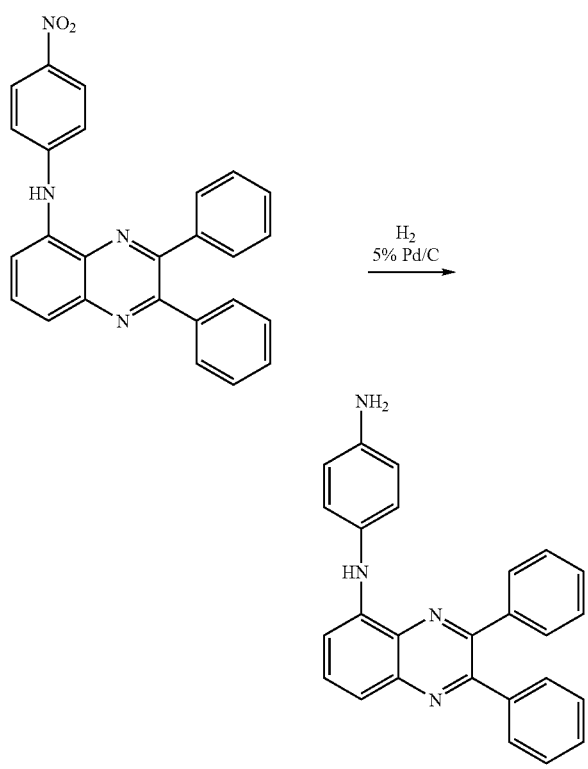

5.4 g (2.9 mmol) of 2,3-diphenyl-5-(4-nitrophenyl)aminoquinoxaline was dissolved in 100 ml of tetrahydrofuran, and a reaction container was purged with nitrogen. Thereafter, 5.0 g of 5% Pd/C (hydrous) was added, followed by sufficient purging with nitrogen again. This system was purged with hydrogen, followed by reaction at room temperature for 10 hours. After completion of the reaction, the system was filtered, and the resulting filtration residue was washed with tetrahydrofuran and filtered again. The solvent was removed from the resulting filtrate, and a reaction product was recrystallized from a mixed solvent of tetrahydrofuran/heptane.

Yield: 3.9 g

Product aspect: orange solid m/z: 388 (calculated: 388.17)

$^{13}$C-NMR: 153.597, 149.658, 142.978, 142.887, 142.009, 139.306, 139.199, 132.290, 131.283, 130.008, 129.825, 128.680, 128.588, 128.267, 128.130, 124.794, 116.198, 116.114, 106.648 ppm Synthetic Example 9

Synthesis of 2,3-di(4-methylphenyl)-5-(4-aminophenyl)aminoquinoxaline

Prepared according to the following procedures (1) and (2).

(1) Synthesis of 2,3-di(4-methylphenyl)-5-(4-nitrophenyl) aminoquinoxaline

[Chemical Formula 52]

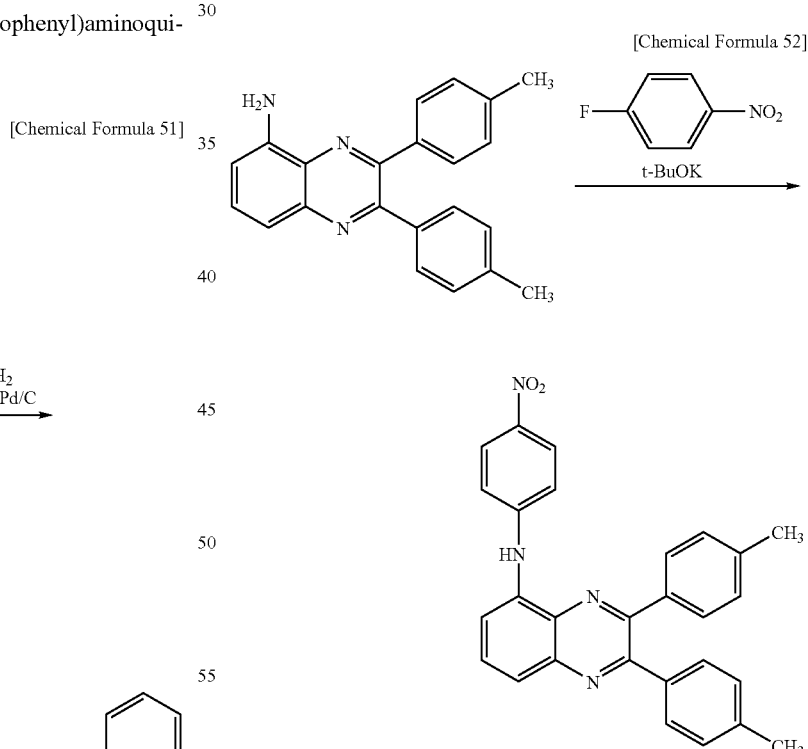

While agitating 3.0 g (9.2 mmol) of 2,3-di(4-methyl-phenyl)-5-aminoquinoxaline, 1.4 g (9.9 mmol) of 4-fluoronitrobenzene and 100 ml of dimethylsulfoxide, 3.4 g (30.3 mmol) of t-butoxy potassium was gently added. After completion of the addition, the reaction container was purged with nitrogen, followed by agitation at room temperature for 20 hours. After completion of the reaction, 100 ml of water was added while cooling, and an organic phase was extracted by use of a chloroform solvent, followed by concentration to obtain the intended product.

Yield: 5.9 g m/z: 446 (calculated: 446.17) (2) Synthesis of 2,3-di(4-methylphenyl)-5-(4-aminophenyl)aminoquinoxaline

[Chemical Formula 53]

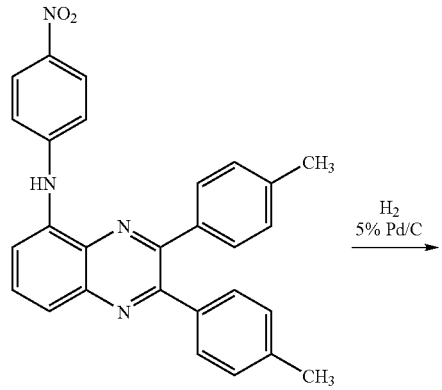

5.9 g (13.2 mmol) of 2,3-di(4-methylphenyl)-5-(4-nitrophenyl)aminoquinoxaline was dissolved in 70 ml of tetrahydrofuran, and a reaction container was purged with nitrogen. Thereafter, 2.0 g of 5% Pd/C (hydrous) was added, followed by sufficient purging with nitrogen again. This system was purged with hydrogen, followed by reaction at room temperature for 13 hours. After completion of the reaction, the system was filtered, and the resulting filtration residue was washed with tetrahydrofuran and filtered again. The solvent was removed from the resulting filtrate, and a reaction product was extracted with a silica gel column.

Yield: 1.1 g

Product aspect: orange solid m/z: 416 (calculated: 416.20)

$^{13}$C-NMR: 153.605, 149.711, 142.719, 141.917, 138.573, 136.543, 132.542, 130.977, 129.863, 129.703, 128.970, 128.870, 124.664, 116.198, 106.480, 21.352 ppm Synthetic Example 10

Synthesis of 2,3-di(4-methoxylphenyl)-5-(4-aminophenyl)aminoquinoxaline

Prepared according to the following procedures (1) and (2).

(1) Synthesis of 2,3-di(4-methoxylphenyl)-5-(4-aminophenyl)aminoquinoxaline

[Chemical Formula 54]

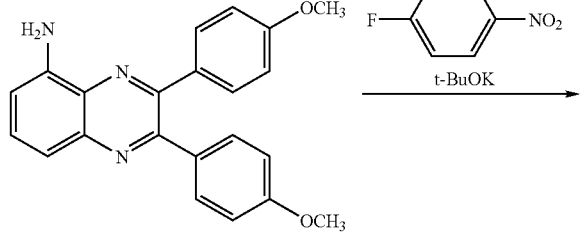

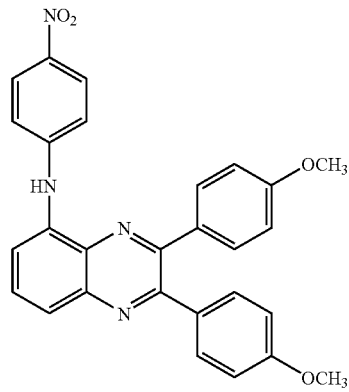

While agitating 5.0 g (14.0 mmol) of 2,3-di(4-methoxylphenyl)-5-aminoquinoxaline, 2.4 g (17.0 mmol) of 4-fluoronitrobenzene and 120 ml of dimethylsulfoxide, 5.7 g (50.8 mmol) of t-butoxy potassium was gently added. After completion of the addition, the reaction container was purged with nitrogen, followed by agitation at room temperature for 8 hours. After completion of the reaction, 100 ml of water was added while cooling, and an organic phase was extracted by use of a chloroform solvent, followed by concentration to obtain the intended product.

Yield: 8.3 g

Product aspect: brown solid (2) Synthesis of 2,3-di(4-methoxylphenyl)-5-(4-aminophenyl)aminoquinoxaline

[Chemical Formula 55]

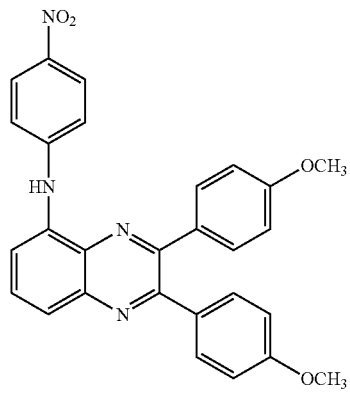

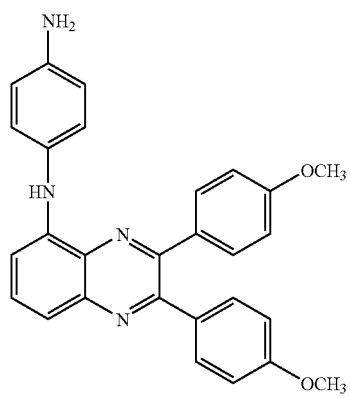

8.3 g (17.3 mmol) of 2,3-di(4-methoxyphenyl)-5-(4-nitrophenyl)aminoquinoxaline was dissolved in 100 ml of tetrahydrofuran, and a reaction container was purged with nitrogen. Thereafter, 5.0 g of 5% Pd/C (hydrous) was added, followed by sufficient purging with nitrogen again. This system was purged with hydrogen, followed by reaction at room temperature for 10 hours. After completion of the reaction, the system was filtered, and the resulting filtration residue was washed with tetrahydrofuran and filtered again. The solvent was removed from the resulting filtrate, and a reaction product was recrystallized in hexane to obtain the intended product.

Yield: 4.5 g

Product aspect: orange solid m/z: 448 (calculated: 448.119)

$^{13}$C-NMR: 163.766, 159.994, 153.131, 148.872, 142.940, 142.688, 141.803, 132.420, 131.947, 131.329, 131.206, 130.779, 124.725, 116.076, 113.755, 113.625, 106.411, 98.953, 55.324 ppm Synthetic Example 11

Synthesis of 2,3-di(2-thienyl)-5-(4-aminophenyl)aminoquinoxaline

Prepared according to the following procedures (1) and (2).

(1) Synthesis of 2,3-di(2-thienyl)-5-(4-nitrophenyl)aminoquinoxaline

[Chemical Formula 56]

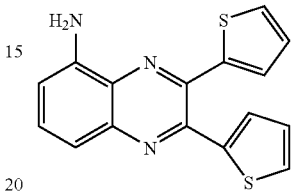 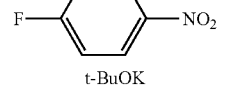

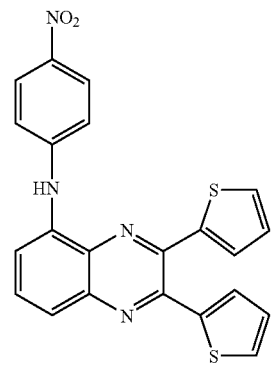

While agitating 3.1 g (9.9 mmol) of 2,3-di(2-thienyl)-5-aminoquinoxaline, 1.4 g (9.9 mmol) of 4-fluoronitrobenzene and 15 g of dimethylsulfoxide, 3.3 g (29.6 mmol) of t-butoxy potassium was gently added. After completion of the addition, the reaction container was purged with nitrogen, followed by agitation at room temperature for 14 hours. After completion of the reaction, 100 ml of water was added while cooling, and the resulting compound was filtered and dried, followed by purification with a silica gel column.

Yield: 2.6 g

Product aspect: yellow solid (2) Synthesis of 2,3-di(2-thienyl)-5-(4-aminophenyl)aminoquinoxaline

[Chemical Formula 57]

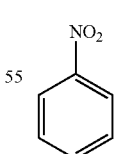

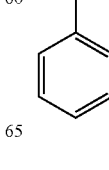

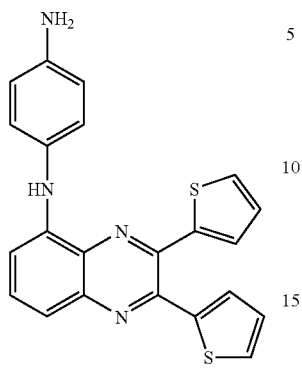

2.2 g (5.1 mmol) of 2,3-di(2-thienyl)-5-(4-nitrophenyl) aminoquinoxaline was dissolved in 50 ml of tetrahydrofuran, and a reaction container was purged with nitrogen. Thereafter, 0.7 g of 5% Pd/C (hydrous) was added, followed by sufficient purging with nitrogen again. This system was purged with hydrogen, followed by reaction at room temperature for 5 hours. After completion of the reaction, the system was filtered, and the resulting filtration residue was washed with tetrahydrofuran and filtered again. The solvent was removed from the resulting filtrate, and a reaction product was extracted with a silica gel column.

Yield: 1.9 g

Product aspect: orange solid m/z: 399 (calculated: 400.08)

$^{13}$C-NMR: 146.665, 143.161, 143.009, 142.619, 142.009, 141.413, 132.084, 131.535, 130.443, 129.061, 128.840, 128.603, 128.473, 127.618, 127.512, 124.878, 116.068, 115.931, 106.930 ppm Synthetic Example 12

Synthesis of N-4-aminophenyl-10-aminodibenzo(A,C)phenazine

Prepared according to the following procedures (1) and (2).

(1) Synthesis of N-4-nitrophenyl-10-aminodibenzo(A,C) phenazine

[Chemical Formula 58]

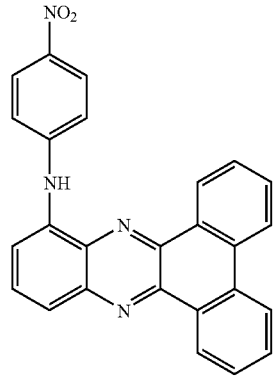

While agitating 10.0 g (34 mmol) of 10-aminodibenzo(A,C)phenazine, 4.8 g (34 mmol) of 4-fluoronitrobenzene and 500 ml of dimethylsulfoxide, 19.4 g (173 mmol) of t-butoxy potassium was gently added. After completion of the addition, the reaction container was charged with nitrogen, followed by agitation at room temperature for 24 hours. After completion of the reaction, 500 ml of water was added while cooling, after which the reaction solution was filtered to obtain a filtration residue. The thus obtained residue was washed with methanol to obtain the intended product.

(2) Synthesis of N-4-aminophenyl-10-aminodibenzo(A,C) phenazine

[Chemical Formula 59]

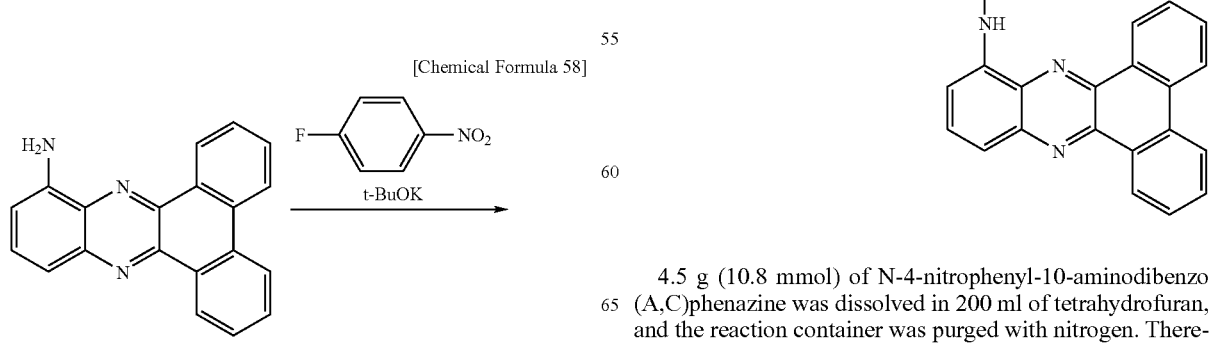

4.5 g (10.8 mmol) of N-4-nitrophenyl-10-aminodibenzo (A,C)phenazine was dissolved in 200 ml of tetrahydrofuran, and the reaction container was purged with nitrogen. Thereafter, 4.6 g of 5% Pd/C (hydrous) was added, followed by sufficient purging with nitrogen again. This system was purged with hydrogen, followed by reaction at room temperature for 10 hours. After completion of the reaction, the system was filtered, and the resulting filtration residue was further washed with tetrahydrofuran and purified with a column to obtain the intended product.

Product aspect: purple crystals m/z: 386 (calculated: 386.15)

$^{13}$C-NMR: 146.771, 145.183, 144.191, 143.244, 139.687, 133.526, 133.022, 132.671, 132.236, 131.434, 131.389, 130.892, 130.587, 128.518, 126.877, 126.320, 125.892, 123.907, 116.319, 115.739, 105.960 ppm Example 1

Synthesis of poly{2,3-diphenyl-5-(4-aminophenyl)aminoquinoxaline}

Using a three-electrode beaker cell equipped with a platinum mesh counter electrode, the intended compound was synthesized by carrying out electrolytic oxidation according to the following potential scanning procedure.

More particularly, there was used a solution of 0.19 mg (0.5 mmol) of 2,3-diphenyl-5-(4-aminophenyl)aminoquinoxaline and 1.05 ml (11 mmol) of perchloric acid dissolved in 6.5 g of N,N-dimethylformamide. Electrolytic polymerization was conducted in such a way that a test electrode substrate used was a platinum sheet (1.0 cm$^2$ per surface) abraded with an emery paper on the surface thereof, a reference electrode was Ag/Ag$^+$, and an electrochemical measuring system (made by BAS Inc.) was used for carrying out potential scanning under conditions of a potential range of 400 to 700 mV, a scanning speed of 50 mVsec$^{-1}$ and 30 potential scanning cycles. The intended compound polymerized on the electrode was obtained.

Product aspect: black solid

TOF-MS: m/z 415 (monomer), 772 (dimer), 1156 (trimer).

Example 2

Synthesis of poly{2,3-di(4-methylphenyl)-5-(4-aminophenyl)aminoquinoxaline}

Using a three-electrode beaker cell equipped with a platinum mesh counter electrode, the intended product was synthesized by carrying out electrolytic oxidation according to the following potential scanning procedure.

More particularly, there was used a solution of 0.21 mg (0.5 mmol) of 2,3-di(4-methylphenyl)-5-(4-aminophenyl)aminoquinoxaline and 1.05 ml (11 mmol) of perchloric acid dissolved in 6.5 g of N,N-dimethylformamide. Electrolytic polymerization was conducted in such a way that a test electrode substrate used was a platinum sheet (1.0 cm$^2$ per surface) abraded with an emery paper on the surface thereof, a reference electrode was Ag/Ag$^+$, and an electrochemical measuring system (made by BAS Inc.) was used for carrying out potential scanning under conditions of a potential range of 1300 to 1600 mV, a scanning speed of 100 mVsec$^{-1}$ and 30 potential scanning cycles. The intended polymerized compound polymerized on the electrode was obtained.

Product aspect: Black solid

TOF-MS: m/z 429 (monomer), 826 (dimer), 1240 (trimer), 1667 (tetramer)

Example 3

Poly{2,3-di(2-thienyl)-5-(4-aminophenyl)aminoquinoxaline}

Using a three-electrode beaker cell equipped with a platinum mesh counter electrode, the intended product was synthesized by carrying out electrolytic oxidation according to the following potential scanning procedure.

More particularly, there was used a solution of 0.20 mg (0.5 mmol) of 2,3-di(4-thienyl)-5-(4-aminophenyl)aminoquinoxaline and 1.05 ml (11 mmol) of perchloric acid dissolved in 6.5 g of N,N-dimethylformamide. Electrolytic polymerization was conducted in such a way that a test electrode substrate used was a platinum sheet (1.0 cm$^2$ per surface) abraded with an emery paper on the surface thereof, a reference electrode was Ag/Ag$^+$, and an electrochemical measuring system (made by BAS Inc.) was used for carrying out potential scanning under conditions of a potential range of 400 to 700 mV, a scanning speed of 100 mVsec$^{-1}$ and 30 potential scanning cycles. The intended polymerized compound polymerized on the electrode was obtained.

Product aspect: black solid

TOF-MS: m/z 398 (monomer), 793 (dimer), 1192 (trimer), 1602 (tetramer), 1987 (pentamer)

Example 4

Synthesis of poly{N-4-aminophenyl-10-aminodibenzo(A,C)phenazine}

Using a three-electrode beaker cell equipped with a platinum mesh counter electrode, the intended product was synthesized by carrying out electrolytic oxidation according to the following constant potential method.

More particularly, there was used a solution of 0.19 mg (0.5 mmol) of N-4-aminophenyl-10-dibenzo(A,C)phenazine and 1.05 ml (11 mmol) of perchloric acid dissolved in 6.5 g of N,N-dimethylformamide. Electrolytic polymerization was conducted in such a way that a test electrode substrate used was a platinum sheet (1.0 cm$^2$ per surface) abraded with an emery paper on the surface thereof, a reference electrode was Ag/Ag$^+$, and an electrochemical measuring system (made by BAS Inc.) was used. According to a constant potential method, polymerization was conducted at 0.7 V while regulating an electric quantity at 2.0 C/cm$^2$, under which a black polymer film was obtained on the surface of the test electrode. The thus obtained film was washed on the surfaces thereof with N,N-dimethylformamide.

TOF-MS: m/z 781 (dimer), 1167 (trimer), 1552 (tetramer), 1940 (pentamer)

Oxidation and reduction peaks measured by cyclic voltammetry (measured in an acetonitrile solution of 0.1 mol/liter of tetraethylammonium perchlorate): oxidation peak at 700 mV, 1000 mV and reduction peak at 200 mV, 300 mV.

The electrode obtained in Example 4 was used to make a cell, and a charge and discharge test was carried out according to the following procedure to obtain an electrostatic capacitance, revealing that it was at 58 F/g. In more detail, a discharge capacitance of 48.5 F/g at the first cycle was obtained, and the capacitance was improved to 65.8 F/g at the fifth cycle. At the tenth cycle, the capacitance was kept at 58.5 F/g.

(Charge and Discharge Testing Method)

Using a three electrode beaker cell wherein the platinum electrode formed with the polymer film thereon was provided as a test electrode, a platinum sheet provided as a counter electrode and Ag/Ag+ provided as a reference electrode, a constant current charge and discharge test was effected under the following conditions.

The above cell was set in an acetonitrile solution of 0.1 mol/liter of tetraethylammonium perchlorate and subjected to measurement at a current density of 0.5 mA/cm² and a cut off potential of 1.5 V to −0.5 V, thereby providing a value at a tenth cycle as a measurement.

Comparative Example 1

Synthesis of poly{10-aminodibenzo(A,C)phenazine}

Using a three-electrode beaker cell equipped with a platinum mesh counter electrode, the intended product was synthesized by carrying out electrolytic oxidation according to the following constant potential method.

More particularly, there was used a solution of 0.15 mg (0.5 mmol) of 10-aminodibenzo (A,C)phenazine and 1.05 ml (11 mmol) of perchloric acid dissolved in 6.5 g of N,N-dimethylformamide. Electrolytic polymerization was conducted in such a way that a test electrode substrate used was a platinum sheet (1.0 cm² per surface) abraded with an emery paper on the surface thereof, a reference electrode was Ag/Ag+, and an electrochemical measuring system (made by BAS Inc.) was used. According to the constant potential method, polymerization was conducted at 0.9 V while regulating an electric quantity at 2.0 C/cm², under which a black polymer film was obtained on the surface of the test electrode. The thus obtained film was washed on the surfaces thereof with N,N-dimethylformamide.

TOF-MS: m/z 596.9 (dimer), 893.9 (trimer), 1192.3 (tetramer), 1488.5 (pentamer), 1788.7 (hexamer), 2088.9 (heptamer)

Oxidation and reduction peaks measured by cyclic voltammetry (measured in an acetonitrile solution of 0.1 mol/liter of tetraethylammonium perchlorate): oxidation peak at 1100 mV and reduction peak at 200 mV.

The electrode obtained in the above Comparative example 1 was used to make a cell, and the cell was subjected to a charge and discharge test under the same conditions as in Example 4. As a result, the electrostatic capacitance was found at 47 F/g. In more detail, a discharge capacitance at a first cycle was at 83.5 F/g, was lowered to 62.0 F/g at a fifth cycle and further lowered to 47.0 F/g at a tenth cycle.

The invention claimed is:

1. An electrode for an energy storage device comprising a polyaminoquinoxaline compound of the following formula (1a) as an electrode active material,

[Chemical Formula 1]

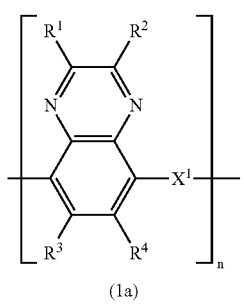

(1a)

wherein $R^1$ and $R^2$ independently represent a hydrogen atom, a hydroxyl group, a $C_1$-$C_{10}$ alkyl group, a $C_1$-$C_{10}$ alkoxy group, a phenyl group which may be substituted with Y, a pyridyl group which may be substituted with Y, a biphenyl group which may be substituted with Y, a naphthyl group which may be substituted with Y, a thienyl group which may be substituted with Y, a pyrrolyl group which may be substituted with Y, a furyl group which may be substituted with Y or a condensed heteroaryl group which may be substituted with Y provided that when $R^1$ and $R^2$ are, respectively, the above-defined phenyl, pyridyl, biphenyl, naphthyl, thienyl, pyrrolyl, furyl or condensed heteroaryl group, these groups may be joined through a single bond;

$R^3$ and $R^4$ independently represent a hydrogen atom, a halogen atom, a cyano group, a nitro group, an amino group, a $C_1$-$C_{10}$ alkyl group, a $C_1$-$C_{10}$ alkoxy group, a phenyl group which may be substituted with Y, a pyridyl group which may be substituted with Y, a biphenyl group which may be substituted with Y, a naphthyl group which may be substituted with Y, a thienyl group which may be substituted with Y, a pyrrolyl group which may be substituted with Y, a furyl group which may be substituted with Y or a condensed heteroaryl group which may be substituted with Y provided that when $R^3$ and $R^4$ are, respectively, the above-defined phenyl, pyridyl, biphenyl, naphthyl, thienyl, pyrrolyl, furyl or condensed heteroaryl group, these groups may be joined through a single bond;

$X^1$ represents —NH—$R^5$—NH— or —NH—$R^6$— wherein $R^5$ and $R^6$ independently represent a $C_1$-$C_{10}$ alkylene group, a —C(O)CH$_2$—, —CH$_2$C(O)—, a divalent benzene ring which may be substituted with Y, a divalent pyridine ring which may be substituted with Y, a divalent biphenyl group which may be substituted with Y, a divalent naphthalene ring which may be substituted with Y, a divalent thiophene ring which may be substituted with Y, a divalent pyrrole ring which may be substituted with Y, a furan ring which may be substituted with Y, or a condensed hetero ring which may be substituted with Y, in which Y represents a halogen atom, a cyano group, a nitro group, an amino group, an epoxy group, a vinyl group, a $C_1$-$C_{10}$ alkyl group, a $C_1$-$C_{10}$ haloalkyl group, a $C_1$-$C_{10}$ alkoxy group, a $C_1$-$C_{10}$ cyanoalkyl group, a phenyl group which may be substituted with Z, a pyridyl group which may be substituted with Z, a biphenyl group which may be substituted with Z, a naphthyl group which may be substituted with Z, a thienyl group which may be substituted with Z, a pyrrolyl group which may be substituted with Z, a furyl group which may be substituted with Z or a condensed heteroaryl group which may be substituted with Z provided that if Y is two or more in number, Y may be the same or different, in which Z represents a halogen atom, a cyano group, a nitro group, an amino group, an epoxy group, a vinyl group, a $C_1$-$C_{10}$ alkyl group, a $C_1$-$C_{10}$ haloalkyl group, a $C_1$-$C_{10}$ alkoxy group, a $C_1$-$C_{10}$ cyanoalkyl group, a phenyl group, a biphenyl group, a naphthyl group, a thienyl group, a pyrrolyl group, a furyl group or a condensed heteroaryl group provided that if Z is two or more in number, Z may be the same or different; and n is an integer of 2 or over.

2. The electrode according to claim 1, wherein $R^1$ and $R^2$ independently represent a group of the following formula (2)

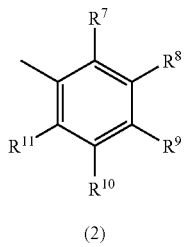

(2)

wherein $R^7$-$R^{11}$ independently represent a hydrogen atom, a halogen atom, a cyano group, a nitro group, an amino group, an epoxy group, a vinyl group, a $C_1$-$C_{10}$ alkyl group, a $C_1$-$C_4$ haloalkyl group, a $C_1$-$C_{10}$ alkoxy group, a $C_1$-$C_4$ cyanoalkyl group, a phenyl group which may be substituted with Z, a naphthyl group which may be substituted with Z or a thienyl group which may be substituted with Z, in which Z represents a halogen atom, a cyano group, a nitro group, an amino group, an epoxy group, a vinyl group, a $C_1$-$C_{10}$ alkyl group, a $C_1$-$C_{10}$ haloalkyl group, a $C_1$-$C_{10}$ alkoxy group, a $C_1$-$C_{10}$ cyanoalkyl group, a phenyl group, a biphenyl group, a naphthyl group, a thienyl group, a pyrrolyl group, a furyl group or a condensed heteroaryl group.

3. The electrode according to claim 1, wherein $R^1$ and $R^2$ independently represent a group of the following formula (3)

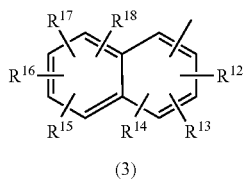

(3)

wherein $R^{12}$-$R^{18}$ independently represent, each substituted at an arbitrary position of the ring of the formula, a hydrogen atom, a halogen atom, a cyano group, a nitro group, an amino group, an epoxy group, a vinyl group, a $C_1$-$C_{10}$ alkyl group, a $C_1$-$C_{10}$ alkoxy group, a phenyl group which may be substituted with Z, a naphthyl group which may be substituted with Z or a thienyl group which may be substituted with Z, in which Z represents a halogen atom, a cyano group, a nitro group, an amino group, an epoxy group, a vinyl group, a $C_1$-$C_{10}$ alkyl group, a $C_1$-$C_{10}$ haloalkyl group, a $C_1$-$C_{10}$ alkoxy group, a $C_1$-$C_{10}$ cyanoalkyl group, a phenyl group, a biphenyl group, a naphthyl group, a thienyl group, a pyrrolyl group, a furyl group or a condensed heteroaryl group.

4. The electrode according to claim 1, wherein $R^1$ and $R^2$ independently represent a group of the following formula (4)

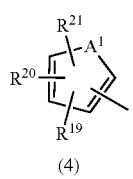

(4)

wherein $R^{19}$-$R^{21}$ independently represent, each substituted at an arbitrary position of the ring of the formula, a hydrogen atom, a halogen atom, a cyano group, a nitro group, an amino group, an epoxy group, a vinyl group, a $C_1$-$C_{10}$ alkyl group, a $C_1$-$C_{10}$ alkoxy group, a phenyl group which may be substituted with Z, a naphthyl group which may be substituted with Z or a thienyl group which may be substituted with Z, in which Z represents a halogen atom, a cyano group, a nitro group, an amino group, an epoxy group, a vinyl group, a $C_1$-$C_{10}$ alkyl group, a $C_1$-$C_{10}$ haloalkyl group, a $C_1$-$C_{10}$ alkoxy group, a $C_1$-$C_{10}$ cyanoalkyl group, a phenyl group, a biphenyl group, a naphthyl group, a thienyl group, a pyrrolyl group, a furyl group or a condensed heteroaryl group; and
$A^1$ represents NH, O or S.

5. The electrode according to claim 1, wherein $R^1$ and $R^2$ independently represent a group of the following formula (5)

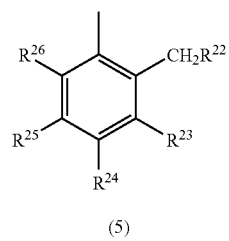

(5)

wherein $R^{22}$ represents a halogen atom or a cyano group, and $R^{23}$-$R^{26}$ independently represent a hydrogen atom, a halogen atom, a cyano group, a nitro group, an amino group, an epoxy group, a vinyl group, a $C_1$-$C_{10}$ alkyl group, a $C_1$-$C_{10}$ alkoxy group, a phenyl group which may be substituted with Z, a naphthyl group which may be substituted with Z or a thienyl group which may be substituted with Z, in which Z represents a halogen atom, a cyano group, a nitro group, an amino group, an epoxy group, a vinyl group, a $C_1$-$C_{10}$ alkyl group, a $C_1$-$C_{10}$ haloalkyl group, a $C_1$-$C_{10}$ alkoxy group, a $C_1$-$C_{10}$ cyanoalkyl group, a phenyl group, a biphenyl group, a naphthyl group, a thienyl group, a pyrrolyl group, a furyl group or a condensed heteroaryl group.

6. The electrode according to claim 1, wherein $R^5$ represents a group of the following formula (6)

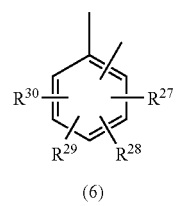

(6)

wherein $R^{27}$-$R^{30}$ independently represent, each substituted at an arbitrary position on the ring of the formula, a hydrogen atom, a halogen atom, a cyano group, a nitro group, an amino group, an epoxy group, a vinyl group, a $C_1$-$C_{10}$ alkyl group, a $C_1$-$C_{10}$ alkoxy group, a phenyl group which may be substituted with Z, a naphthyl group which may be substituted with Z or a thienyl group which may be substituted with Z, in which Z represents a halogen atom, a cyano group, a nitro group, an amino group, an epoxy group, a vinyl group, a $C_1$-$C_{10}$ alkyl group, a $C_1$-$C_{10}$ haloalkyl group, a $C_1$-$C_{10}$ alkoxy group, a $C_1$-$C_{10}$ cyanoalkyl group, a phenyl group, a biphenyl group, a naphthyl group, a thienyl group, a pyrrolyl group, a furyl group or a condensed heteroaryl group.

7. The electrode according to claim 1, wherein $R^5$ represents a group of the following formula (7)

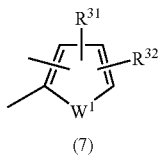

(7)

[Chemical Formula 7]

wherein $R^{31}$-$R^{32}$ independently represent, each substituted at an arbitrary position on the ring of the formula, a hydrogen atom, a halogen atom, a cyano group, a nitro group, an amino group, an epoxy group, a vinyl group, a $C_1$-$C_{10}$ alkyl group, a $C_1$-$C_{10}$ alkoxy group, a phenyl group which may be substituted with Z, a naphthyl group which may be substituted with Z or a thienyl group which may be substituted with Z, in which Z represents a halogen atom, a cyano group, a nitro group, an amino group, an epoxy group, a vinyl group, a $C_1$-$C_{10}$ alkyl group, a $C_1$-$C_{10}$ haloalkyl group, a $C_1$-$C_{10}$ alkoxy group, a $C_1$-$C_{10}$ cyanoalkyl group, a phenyl group, a biphenyl group, a naphthyl group, a thienyl group, a pyrrolyl group, a furyl group or a condensed heteroaryl group; and $W^1$ represents NH, O or S.

8. The electrode according to claim 1, wherein $R^5$ represents a group of the following formula (8)

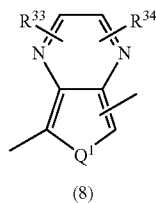

(8)

[Chemical Formula 8]

wherein $R^{33}$-$R^{34}$ independently represent, each substituted at an arbitrary position on the ring of the formula, a hydrogen atom, a halogen atom, a cyano group, a nitro group, an amino group, an epoxy group, a vinyl group, a $C_1$-$C_{10}$ alkyl group, a $C_1$-$C_{10}$ alkoxy group, a phenyl group which may be substituted with Z, a naphthyl group which may be substituted with Z or a thienyl group which may be substituted with Z, in which Z represents a halogen atom, a cyano group, a nitro group, an amino group, an epoxy group, a vinyl group, a $C_1$-$C_{10}$ alkyl group, a $C_1$-$C_{10}$ haloalkyl group, a $C_1$-$C_{10}$ alkoxy group, a $C_1$-$C_{10}$ cyanoalkyl group, a phenyl group, a biphenyl group, a naphthyl group, a thienyl group, a pyrrolyl group, a furyl group or a condensed heteroaryl group; and $Q^1$ represents NH, O or S.

9. The electrode according to claim 1, wherein $R^5$ represents a group of the following formula (9)

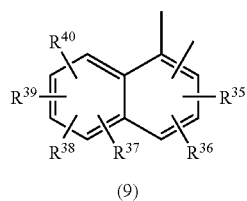

(9)

[Chemical Formula 9]

wherein $R^{35}$-$R^{40}$ independently represent, each substituted at an arbitrary position on the ring of the formula, a hydrogen atom, a halogen atom, a cyano group, a nitro group, an amino group, an epoxy group, a vinyl group, a $C_1$-$C_{10}$ alkyl group, a $C_1$-$C_{10}$ alkoxy group, a phenyl group which may be substituted with Z, a naphthyl group which may be substituted with Z or a thienyl group which may be substituted with Z, in which Z represents a halogen atom, a cyano group, a nitro group, an amino group, an epoxy group, a vinyl group, a $C_1$-$C_{10}$ alkyl group, a $C_1$-$C_{10}$ haloalkyl group, a $C_1$-$C_{10}$ alkoxy group, a $C_1$-$C_{10}$ cyanoalkyl group, a phenyl group, a biphenyl group, a naphthyl group, a thienyl group, a pyrrolyl group, a furyl group or a condensed heteroaryl group.

10. The electrode according to claim 1, wherein $R^6$ represents a group of the following formula (10)

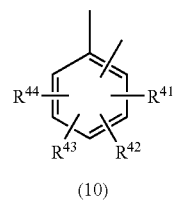

(10)

[Chemical Formula 10]

wherein $R^{41}$-$R^{44}$ independently represent, each substituted on an arbitrary position of the ring of the formula, a hydrogen atom, a halogen atom, a cyano group, a nitro group, an amino group, an epoxy group, a vinyl group, a $C_1$-$C_{10}$ alkyl group, a $C_1$-$C_{10}$ alkoxy group, a phenyl group which may be substituted with Z, a naphthyl group which may be substituted with Z or a thienyl group which may be substituted with Z, in which Z represents a halogen atom, a cyano group, a nitro group, an amino group, an epoxy group, a vinyl group, a $C_1$-$C_{10}$ alkyl group, a $C_1$-$C_{10}$ haloalkyl group, a $C_1$-$C_{10}$ alkoxy group, a $C_1$-$C_{10}$ cyanoalkyl group, a phenyl group, a biphenyl group, a naphthyl group, a thienyl group, a pyrrolyl group, a furyl group or a condensed heteroaryl group.

11. The electrode according to claim 1, wherein $R^6$ represents a group of the following formula (11)

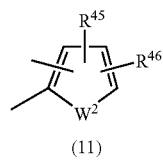

(11)

[Chemical Formula 11]

wherein $R^{45}$-$R^{46}$ independently represent, each substituted on an arbitrary position of the ring of the formula, a hydrogen atom, a halogen atom, a cyano group, a nitro group, an amino group, an epoxy group, a vinyl group, a $C_1$-$C_{10}$ alkyl group, a $C_1$-$C_{10}$ alkoxy group, a phenyl group which may be substituted with Z, a naphthyl group which may be substituted with Z or a thienyl group which may be substituted with Z, in which Z represents a halogen atom, a cyano group, a nitro group, an amino group, an epoxy group, a vinyl group, a $C_1$-$C_{10}$ alkyl group, a $C_1$-$C_{10}$ haloalkyl group, a $C_1$-$C_{10}$ alkoxy group, a $C_1$-$C_{10}$ cyanoalkyl group, a phenyl group, a biphenyl group, a naphthyl group, a thienyl group, a pyrrolyl group, a furyl group or a condensed heteroaryl group; and $W^2$ represents NH, O or S.

12. The electrode according to claim 1, wherein $R^6$ represents a group of the following formula (12)

[Chemical Formula 12]

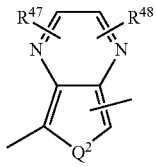

(12)

wherein $R^{47}$-$R^{48}$ independently represent, each substituted on an arbitrary position of the ring of the formula, a hydrogen atom, a halogen atom, a cyano group, a nitro group, an amino group, an epoxy group, a vinyl group, a $C_1$-$C_{10}$ alkyl group, a $C_1$-$C_{10}$ alkoxy group, a phenyl group which may be substituted with Z, a naphthyl group which may be substituted with Z or a thienyl group which may be substituted with Z, in which Z represents a halogen atom, a cyano group, a nitro group, an amino group, an epoxy group, a vinyl group, a $C_1$-$C_{10}$ alkyl group, a $C_1$-$C_{10}$ haloalkyl group, a $C_1$-$C_{10}$ alkoxy group, a $C_1$-$C_{10}$ cyanoalkyl group, a phenyl group, a biphenyl group, a naphthyl group, a thienyl group, a pyrrolyl group, a furyl group or a condensed heteroaryl group; and $Q^2$ represents NH, O or S.

13. The electrode according to claim 1, wherein $R^6$ represents a group of the following formula (13)

[Chemical Formula 13]

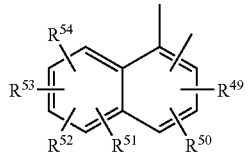

(13)

wherein $R^{49}$-$R^{54}$ independently represent, each substituted on an arbitrary position of the ring of the formula, a hydrogen atom, a halogen atom, a cyano group, a nitro group, an amino group, an epoxy group, a vinyl group, a $C_1$-$C_{10}$ alkyl group, a $C_1$-$C_{10}$ alkoxy group, a phenyl group which may be substituted with Z, a naphthyl group which may be substituted with Z or a thienyl group which may be substituted with Z, in which Z represents a halogen atom, a cyano group, a nitro group, an amino group, an epoxy group, a vinyl group, a $C_1$-$C_{10}$ alkyl group, a $C_1$-$C_{10}$ haloalkyl group, a $C_1$-$C_{10}$ alkoxy group, a $C_1$-$C_{10}$ cyanoalkyl group, a phenyl group, a biphenyl group, a naphthyl group, a thienyl group, a pyrrolyl group, a furyl group or a condensed heteroaryl group.

14. The electrode according to claim 1, wherein the group formed by bonding $R^1$ and $R^2$ through a singe bond is represented by the formula (14)

[Chemical Formula 14]

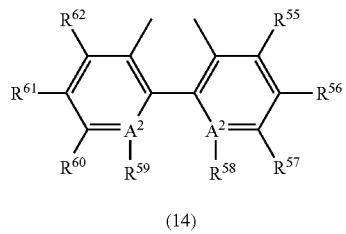

(14)

wherein $A^2$'s are each C or N, $R^{55}$-$R^{62}$ independently represent a hydrogen atom, a halogen atom, a cyano group, a nitro group, an amino group, an epoxy group, a vinyl group, a $C_1$-$C_{10}$ alkyl group, a $C_1$-$C_{10}$ alkoxy group, a phenyl group which may be substituted with Z, a naphthyl group which may be substituted with Z or a thienyl group which may be substituted with Z, in which Z represents a halogen atom, a cyano group, a nitro group, an amino group, an epoxy group, a vinyl group, a $C_1$-$C_{10}$ alkyl group, a $C_1$-$C_{10}$ haloalkyl group, a $C_1$-$C_{10}$ alkoxy group, a $C_1$-$C_{10}$ cyanoalkyl group, a phenyl group, a biphenyl group, a naphthyl group, a thienyl group, a pyrrolyl group, a furyl group or a condensed heteroaryl group, provided that when $A^2$ represents N, $R^{58}$ and $R^{59}$ are both non-existent.

15. An electrode for an energy storage device comprising a polyaminoquinoxaline compound of the following formula (1b) as an electrode active material

[Chemical Formula 15]

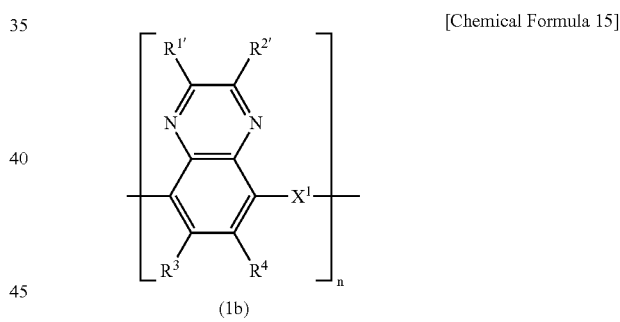

(1b)

wherein $R^{1'}$ and $R^{2'}$ join together to form —$CH_2CH_2CH_2$—, —$CH_2CH_2O$—, —$OCH_2CH_2$—, —$CH_2OCH_2$—, —$OCH_2O$—, —$CH_2CH_2S$—, —$SCH_2CH_2$—, —$CH_2SCH_2$—, —$CH_2CH_2N(R')$—, —$N(R')CH_2CH_2$—, —$CH_2N(R')CH_2$—, —$CH_2CH_2CH_2CH_2$—, —$CH_2CH_2CH_2O$—, —$OCH_2CH_2CH_2$—, —$CH_2CH_2OCH_2$—, —$CH_2OCH_2CH_2$—, —$CH_2OCH_2O$—, —$OCH_2CH_2O$—, —$SCH_2CH_2S$—, —$OCH_2CH_2S$—, —$SCH_2CH_2O$—, —$CH_2CH=CH$—, —$CH=CHCH_2$—, —$OCH=CH$—, —$CH=CHO$—, —$SCH=CH$—, —$CH=CHS$—, —$N(R')CH=CH$—, —$CH=CHN(R')$—, —$OCH=N$—, —$N=CHO$—, —$SCH=N$—, —$N=CHS$—, —$N(R')CH=N$—, —$N=CHN(R')$—, —$N(R')N=CH$—, —$CH=N(R')N$—, —$CH=CHCH=CH$—, —$OCH_2CH=CH$—, —$CH=CHCH_2O$—, —$N=CHCH=CH$—, —$CH=CHCH=N$—, —$N=CHCH=N$—, —$N=CHN=CH$—, or —$CH=NCH=N$— wherein a hydrogen atom bonded to a carbon atom of these groups may be substituted with Y, and R' represents a hydrogen atom, a $C_1$-$C_{10}$ alkyl group, a $C_1$-$C_{10}$ haloalkyl group, a $C_1$-$C_{10}$ cyanoalkyl group, a phenyl group which may be substituted with Z, a pyridyl group which may be substituted with Z, a biphenyl group which may be substituted with Z, a naphthyl group which may be substituted with Z, a thienyl group which may be substituted with Z, a pyrrolyl group which may be substituted with Z, a furyl group which may be substituted with Z, or a condensed heteroaryl group which may be substituted with Z;

$R^3$ and $R^4$ independently represent a hydrogen atom, a halogen atom, a cyano group, a nitro group, an amino group, a $C_1$-$C_{10}$ alkyl group, a $C_1$-$C_{10}$ alkoxy group, a phenyl group which may be substituted with Y, a pyridyl group which may be substituted with Y, a biphenyl group which may be substituted with Y, a naphthyl group which may be substituted with Y, a thienyl group which may be substituted with Y, a pyrrolyl group which may be substituted with Y, a furyl group which may be substituted with Y or a condensed heteroaryl group which may be substituted with Y provided that when $R^3$ and $R^4$ are, respectively, the above-defined phenyl, pyridyl, biphenyl, naphthyl, thienyl, pyrrolyl, furyl or condensed heteroaryl group, these groups may be joined through a single bond; and $X^1$ represents —NH—$R^5$—NH— or —NH—$R^6$— wherein $R^5$ and $R^6$ independently represent a $C_1$-$C_{10}$ alkylene group, a —C(O)CH$_2$—, —CH$_2$C(O)—, a divalent benzene ring which may be substituted with Y, a divalent pyridine ring which may be substituted with Y, a divalent biphenyl group which may be substituted with Y, a divalent naphthalene ring which may be substituted with Y, a divalent thiophene ring which may be substituted with Y, a divalent pyrrole ring which may be substituted with Y, a furan ring which may be substituted with Y, or a condensed hetero ring which may be substituted with Y;

Y represents a halogen atom, a cyano group, a nitro group, an amino group, an epoxy group, a vinyl group, a $C_1$-$C_{10}$ alkyl group, a $C_1$-$C_{10}$ haloalkyl group, a $C_1$-$C_{10}$ alkoxy group, a $C_1$-$C_{10}$ cyanoalkyl group, a phenyl group which may be substituted with Z, a pyridyl group which may be substituted with Z, a biphenyl group which may be substituted with Z, a naphthyl group which may be substituted with Z, a thienyl group which may be substituted with Z, a pyrrolyl group which may be substituted with Z, a furyl group which may be substituted with Z or a condensed heteroaryl group which may be substituted with Z provided that if Y is two or more in number, Y may be the same or different;

Z represents a halogen atom, a cyano group, a nitro group, an amino group, an epoxy group, a vinyl group, a $C_1$-$C_{10}$ alkyl group, a $C_1$-$C_{10}$ haloalkyl group, a $C_1$-$C_{10}$ alkoxy group, a $C_1$-$C_{10}$ cyanoalkyl group, a phenyl group, a biphenyl group, a naphthyl group, a thienyl group, a pyrrolyl group, a furyl group or a condensed heteroaryl group provided that if Z is two or more in number, Z may be the same or different; and n is an integer of 2 or over.

16. An electrode for an energy storage device comprising a polyaminoquinoxaline compound of the following formula (1c) as an electrode active material

[Chemical Formula 16]

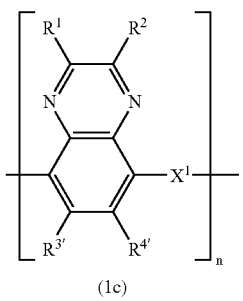

(1c)

wherein $R^1$ and $R^2$ independently represent a hydrogen atom, a hydroxyl group, a $C_1$-$C_{10}$ alkyl group, a $C_1$-$C_{10}$ alkoxy group, a phenyl group which may be substituted with Y, a pyridyl group which may be substituted with Y, a biphenyl group which may be substituted with Y, a naphthyl group which may be substituted with Y, a thienyl group which may be substituted with Y, a pyrrolyl group which may be substituted with Y, a furyl group which may be substituted with Y or a condensed heteroaryl group which may be substituted with Y provided that when $R^1$ and $R^2$ are, respectively, the above-defined phenyl, pyridyl, biphenyl, naphthyl, thienyl, pyrrolyl, furyl or condensed heteroaryl group, these groups may be joined through a single bond;

$R^{3'}$ and $R^{4'}$ join together to form —CH$_2$CH$_2$CH$_2$—, —CH$_2$CH$_2$O—, —OCH$_2$CH$_2$—, —CH$_2$OCH$_2$—, —OCH$_2$O—, —CH$_2$CH$_2$S—, —SCH$_2$CH$_2$—, —CH$_2$SCH$_2$—, —CH$_2$CH$_2$N(R')—, —N(R')CH$_2$CH$_2$—, —CH$_2$N(R')CH$_2$—, —CH$_2$CH$_2$CH$_2$CH$_2$—, —CH$_2$CH$_2$CH$_2$O—, —OCH$_2$CH$_2$CH$_2$—, —CH$_2$CH$_2$OCH$_2$—, —CH$_2$OCH$_2$CH$_2$—, —CH$_2$OCH$_2$O—, —OCH$_2$CH$_2$O—, —SCH$_2$CH$_2$S—, —OCH$_2$CH$_2$S—, —SCH$_2$CH$_2$O—, —CH$_2$CH=CH—, —CH=CHCH$_2$—, —OCH=CH—, —CH=CHO—, —SCH=CH—, —CH=CHS—, —N(R')CH=CH—, —CH=CHN(R')—, —OCH=N—, —N=CHO—, —SCH=N—, —N=CHS—, —N(R')CH=N—, —N=CHN(R')—, —N(R')N=CH—, —CH=N(R')N—, —CH=CHCH=CH—, —OCH$_2$CH=CH—, —CH=CHCH$_2$O—, —N=CHCH=CH—, —CH=CHCH=N—, —N=CHCH=N—, —N=CHN=CH—, or —CH=NCH=N— wherein a hydrogen atom bonded to a carbon atom of these groups may be substituted with Y, and R' represents a hydrogen atom, a $C_1$-$C_{10}$ alkyl group, a $C_1$-$C_{10}$ haloalkyl group, a $C_1$-$C_{10}$ cyanoalkyl group, a phenyl group which may be substituted with Z, a pyridyl group which may be substituted with Z, a biphenyl group which may be substituted with Z, a naphthyl group which may be substituted with Z, a thienyl group which may be substituted with Z, a pyrrolyl group which may be substituted with Z, a furyl group which may be substituted with Z, or a condensed heteroaryl group which may be substituted with Z;

$X^1$ represents —NH—$R^5$—NH— or —NH—$R^6$— wherein $R^5$ and $R^6$ independently represent a $C_1$-$C_{10}$ alkylene group, a —C(O)CH$_2$—, —CH$_2$C(O)—, a divalent benzene ring which may be substituted with Y, a divalent pyridine ring which may be substituted with Y, a divalent biphenyl group which may be substituted with Y, a divalent naphthalene ring which may be substituted with Y, a divalent thiophene ring which may be substituted with Y, a divalent pyrrole ring which may be substituted with Y, a furan ring which may be substituted with Y, or a condensed hetero ring which may be substituted with Y;

Y represents a halogen atom, a cyano group, a nitro group, an amino group, an epoxy group, a vinyl group, a $C_1$-$C_{10}$ alkyl group, a $C_1$-$C_{10}$ haloalkyl group, a $C_1$-$C_{10}$ alkoxy group, a $C_1$-$C_{10}$ cyanoalkyl group, a phenyl group which may be substituted with Z, a pyridyl group which may be substituted with Z, a biphenyl group which may be substituted with Z, a naphthyl group which may be substituted with Z, a thienyl group which may be substituted with Z, a pyrrolyl group which may be substituted with Z, a furyl group which may be substituted with Z or a condensed heteroaryl group which may be substituted with Z provided that if Y is two or more in number, Y may be the same or different;

Z represents a halogen atom, a cyano group, a nitro group, an amino group, an epoxy group, a vinyl group, a $C_1$-$C_{10}$ alkyl group, a $C_1$-$C_{10}$ haloalkyl group, a $C_1$-$C_{10}$ alkoxy group, a $C_1$-$C_{10}$ cyanoalkyl group, a phenyl group, a biphenyl group, a naphthyl group, a thienyl group, a pyrrolyl group, a furyl group or a condensed heteroaryl group provided that if Z is two or more in number, Z may be the same or different; and n is an integer of 2 or over.

17. An electrode for an energy storage device comprising a polyaminoquinoxaline compound of the following formula (1d) as an electrode active material

[Chemical Formula 17]

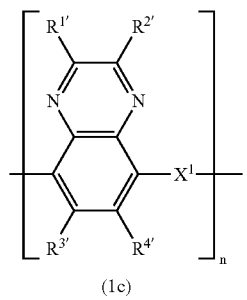

(1c)

wherein $R^{1'}$ and $R^{2'}$ join together to form —CH$_2$CH$_2$CH$_2$—, —CH$_2$CH$_2$O—, —OCH$_2$CH$_2$—, —CH$_2$OCH$_2$—, —OCH$_2$O—, —CH$_2$CH$_2$S—, —SCH$_2$CH$_2$—, —CH$_2$SCH$_2$—, —CH$_2$CH$_2$N(R')—, —N(R')CH$_2$CH$_2$—, —CH$_2$N(R')CH$_2$—, —CH$_2$CH$_2$CH$_2$CH$_2$—, —CH$_2$CH$_2$CH$_2$O—, —OCH$_2$CH$_2$CH$_2$—, —CH$_2$CH$_2$OCH$_2$—, —CH$_2$OCH$_2$CH$_2$—, —CH$_2$OCH$_2$CH$_2$—, —CH$_2$OCH$_2$O—, —CH$_2$OCH$_2$O—, —OCH$_2$CH$_2$O—, —SCH$_2$CH$_2$S—, —OCH$_2$CH$_2$S—, —SCH$_2$CH$_2$O—, —CH$_2$CH═CH—, —CH═CHCH$_2$—, —OCH═CH—, —CH═CHO—, —SCH═CH—, —CH═CHS—, —N(R')CH═CH—, —CH═CHN(R')—, —OCH═N—, —N═CHO—, —SCH═N—, —N═CHS—, —N(R')CH═N—, —N═CHN(R')—, —N(R')N═CH—, —CH═N(R')N—, —CH═CHCH═CH—, —OCH$_2$CH═CH—, —CH═CHCH$_2$O—, —N═CHCH═CH—, —CH═CHCH═N—, —N═CHCH═N—, —N═CHN═CH—, or —CH═NCH═N— wherein a hydrogen atom bonded to a carbon atom of these groups may be substituted with Y, and R' represents a hydrogen atom, a $C_1$-$C_{10}$ alkyl group, a $C_1$-$C_{10}$ haloalkyl group, a $C_1$-$C_{10}$ cyanoalkyl group, a phenyl group which may be substituted with Z, a pyridyl group which may be substituted with Z, a biphenyl group which may be substituted with Z, a naphthyl group which may be substituted with Z, a thienyl group which may be substituted with Z, a pyrrolyl group which may be substituted with Z, a furyl group which may be substituted with Z, or a condensed heteroaryl group which may be substituted with Z;

$R^{3'}$ and $R^{4'}$ join together to form —CH$_2$CH$_2$CH$_2$—, —CH$_2$CH$_2$O—, —OCH$_2$CH$_2$—, —CH$_2$OCH$_2$—, —OCH$_2$O—, —CH$_2$CH$_2$S—, —SCH$_2$CH$_2$—, —CH$_2$SCH$_2$—, —CH$_2$CH$_2$N(R')—, —N(R')CH$_2$CH$_2$—, —CH$_2$N(R')CH$_2$—, —CH$_2$CH$_2$CH$_2$CH$_2$—, —CH$_2$CH$_2$CH$_2$O—, —OCH$_2$CH$_2$CH$_2$—, —CH$_2$CH$_2$OCH$_2$—, —CH$_2$OCH$_2$CH$_2$—, —CH$_2$OCH$_2$O—, —OCH$_2$CH$_2$O—, —SCH$_2$CH$_2$S—, —OCH$_2$CH$_2$S—, —SCH$_2$CH$_2$O—, —CH$_2$CH═CH—, —CH═CHCH$_2$—, —OCH═CH—, —CH═CHO—, —SCH═CH—, —CH═CHS—, —N(R')CH═CH—, —CH═CHN(R')—, —OCH═N—, —N═CHO—, —SCH═N—, —N═CHS—, —N(R')CH═N—, —N═CHN(R')—, —N(R')N═CH—, —CH═N(R')N—, —CH═CHCH═CH—, —OCH$_2$CH═CH—, —CH═CHCH$_2$O—, —N═CHCH═CH—, —CH═CHCH═N—, —N═CHCH═N—, —N═CHN═CH—, or —CH═NCH═N— wherein a hydrogen atom bonded to a carbon atom of these groups may be substituted with Y, and R' represents a hydrogen atom, a $C_1$-$C_{10}$ alkyl group, a $C_1$-$C_{10}$ haloalkyl group, a $C_1$-$C_{10}$ cyanoalkyl group, a phenyl group which may be substituted with Z, a pyridyl group which may be substituted with Z, a biphenyl group which may be substituted with Z, a naphthyl group which may be substituted with Z, a thienyl group which may be substituted with Z, a pyrrolyl group which may be substituted with Z, a furyl group which may be substituted with Z, or a condensed heteroaryl group which may be substituted with Z;

$X^1$ represents —NH—$R^5$—NH— or —NH—$R^6$— wherein $R^5$ and $R^6$ independently represent a $C_1$-$C_{10}$ alkylene group, a —C(O)CH$_2$—, —CH$_2$C(O)—, a divalent benzene ring which may be substituted with Y, a divalent pyridine ring which may be substituted with Y, a divalent biphenyl group which may be substituted with Y, a divalent naphthalene ring which may be substituted with Y, a divalent thiophene ring which may be substituted with Y, a divalent pyrrole ring which may be substituted with Y, a furan ring which may be substituted with Y, or a condensed hetero ring which may be substituted with Y;

Y represents a halogen atom, a cyano group, a nitro group, an amino group, an epoxy group, a vinyl group, a $C_1$-$C_{10}$ alkyl group, a $C_1$-$C_{10}$ haloalkyl group, a $C_1$-$C_{10}$ alkoxy group, a $C_1$-$C_{10}$ cyanoalkyl group, a phenyl group which may be substituted with Z, a pyridyl group which may be substituted with Z, a biphenyl group which may be substituted with Z, a naphthyl group which may be substituted with Z, a thienyl group which may be substituted with Z, a pyrrolyl group which may be substituted with Z, a furyl group which may be substituted with Z or a condensed heteroaryl group which may be substituted with Z provided that if Y is two or more in number, Y may be the same or different;

Z represents a halogen atom, a cyano group, a nitro group, an amino group, an epoxy group, a vinyl group, a $C_1$-$C_{10}$ alkyl group, a $C_1$-$C_{10}$ haloalkyl group, a $C_1$-$C_{10}$ alkoxy group, a $C_1$-$C_{10}$ cyanoalkyl group, a phenyl group, a biphenyl group, a naphthyl group, a thienyl group, a pyrrolyl group, a furyl group or a condensed heteroaryl group provided that if Z is two or more in number, Z may be the same or different; and n is an integer of 2 or over.

18. The electrode according to claim 15, wherein the group formed by joining $R^{1'}$ and $R^{2'}$ together is of the formula (15)

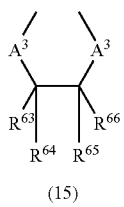

[Chemical Formula 18]

(15)

wherein $A^3$ represents O or S, and $R^{63}$-$R^{66}$ independently represent a hydrogen atom, a halogen atom, a cyano group, a nitro group, an amino group, an epoxy group, a vinyl group, a $C_1$-$C_{10}$ alkyl group, a $C_1$-$C_{10}$ alkoxy group, a phenyl group which may be substituted with Z, a naphthyl group which may be substituted with Z or a thienyl group which may be substituted with Z, in which Z represents a halogen atom, a cyano group, a nitro group, an amino group, an epoxy group, a vinyl group, a $C_1$-$C_{10}$ alkyl group, a $C_1$-$C_{10}$ haloalkyl group, a $C_1$-$C_{10}$ alkoxy group, a $C_1$-$C_{10}$ cyanoalkyl group, a phenyl group, a biphenyl group, a naphthyl group, a thienyl group, a pyrrolyl group, a furyl group or a condensed heteroaryl group.

19. The electrode according to claim 16, wherein the group formed by joining $R^{3'}$ and $R^{4'}$ together is of the formula (16)

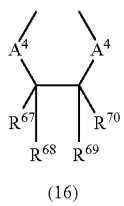

[Chemical Formula 19]

(16)

wherein $A^4$ represents O or S, and $R^{67}$-$R^{70}$ independently represent a hydrogen atom, a halogen atom, a cyano group, a nitro group, an amino group, an epoxy group, a vinyl group, a $C_1$-$C_{10}$ alkyl group, a $C_1$-$C_{10}$ alkoxy group, a phenyl group which may be substituted with Z, a naphthyl group which may be substituted with Z or a thienyl group which may be substituted with Z, in which Z represents a halogen atom, a cyano group, a nitro group, an amino group, an epoxy group, a vinyl group, a $C_1$-$C_{10}$ alkyl group, a $C_1$-$C_{10}$ haloalkyl group, a $C_1$-$C_{10}$ alkoxy group, a $C_1$-$C_{10}$ cyanoalkyl group, a phenyl group, a biphenyl group, a naphthyl group, a thienyl group, a pyrrolyl group, a furyl group or a condensed heteroaryl group.

20. The electrode according to claim 16, wherein the group formed by joining $R^{3'}$ and $R^{4'}$ is of the formula (17)

[Chemical Formula 20]

(17)

wherein $R^{71}$ and $R^{72}$ independently represent a hydrogen atom, a halogen atom, a cyano group, a nitro group, an amino group, an epoxy group, a vinyl group, a $C_1$-$C_{10}$ alkyl group, a $C_1$-$C_{10}$ alkoxy group, a phenyl group which may be substituted with Z, a naphthyl group which may be substituted with Z or a thienyl group which may be substituted with Z, in which Z represents a halogen atom, a cyano group, a nitro group, an amino group, an epoxy group, a vinyl group, a $C_1$-$C_{10}$ alkyl group, a $C_1$-$C_{10}$ haloalkyl group, a $C_1$-$C_{10}$ alkoxy group, a $C_1$-$C_{10}$ cyanoalkyl group, a phenyl group, a biphenyl group, a naphthyl group, a thienyl group, a pyrrolyl group, a furyl group or a condensed heteroaryl group.

21. An energy storage device comprising an electrode for an energy storage device according to claim 1.

22. A method for making an electrode for an energy storage device according to claim 1, which method comprising applying and building up, on a current collector electrode, an electrode active material made of a polyaminoquinoxaline compound represented by the afore-indicated formula (1a).

23. A method for making an electrode for an energy storage device according to claim 15, which method comprising applying and building up, on a current collector electrode, an electrode active material made of a polyaminoquinoxaline compound represented by the afore-indicated formula (1b).

24. A method for making an electrode for an energy storage device according to claim 16, which method comprising applying and building up, on a current collector electrode, an electrode active material made of a polyaminoquinoxaline compound represented by the afore-indicated formula (1c).

25. A method for making an electrode for an energy storage device according to claim 17, which method comprising applying and building up, on a current collector electrode, an electrode active material made of a polyaminoquinoxaline compound represented by the afore-indicated formula (1d).

26. A method for making an electrode for an energy storage device as recited in claim 1 above, which method comprising electrolytically polymerizing an aminoquinoxaline compound represented by the formula (18a) on a current collector electrode,

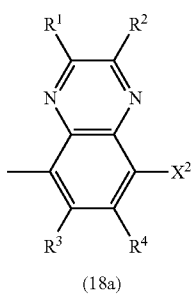

[Chemical Formula 21]

(18a)

wherein $R^1$ and $R^2$ independently represent a hydrogen atom, a hydroxyl group, a $C_1$-$C_{10}$ alkyl group, a $C_1$-$C_{10}$ alkoxy group, a phenyl group which may be substituted with Y, a pyridyl group which may be substituted with Y, a biphenyl group which may be substituted with Y, a naphthyl group which may be substituted with Y, a thienyl group which may be substituted with Y, a pyrrolyl group which may be substituted with Y, a furyl group which may be substituted with Y or a condensed heteroaryl group which may be substituted with Y provided that when $R^1$ and $R^2$ are, respectively, the above-defined phenyl, pyridyl, biphenyl, naphthyl, thienyl, pyrrolyl, furyl or condensed heteroaryl group, these groups may be joined through a single bond;

$R^3$ and $R^4$ independently represent a hydrogen atom, a halogen atom, a cyano group, a nitro group, an amino group, a $C_1$-$C_{10}$ alkyl group, a $C_1$-$C_{10}$ alkoxy group, a phenyl group which may be substituted with Y, a pyridyl group which may be substituted with Y, a biphenyl group which may be substituted with Y, a naphthyl group which may be substituted with Y, a thienyl group which may be substituted with Y, a pyrrolyl group which may be substituted with Y, a furyl group which may be substituted with Y or a condensed heteroaryl group which may be substituted with Y provided that when $R^3$ and $R^4$ are, respectively, the above-defined phenyl, pyridyl, biphenyl, naphthyl, thienyl, pyrrolyl, furyl or condensed heteroaryl group, these groups may be joined through a single bond;

$X^2$ represents —NH—$R^{73}$—$NH_2$ or —NH—$R^{74}$, in which $R^{73}$ represents a $C_1$-$C_{10}$ alkylene group, a —C(O)$CH_2$—, —$CH_2$C(O)—, a divalent benzene ring which may be substituted with Y, a divalent pyridine ring which may be substituted with Y, a divalent biphenyl group which may be substituted with Y, a divalent naphthalene ring which may be substituted with Y, a divalent thiophene ring which may be substituted with Y, a divalent pyrrole ring which may be substituted with Y, a furan ring which may be substituted with Y, or a condensed hetero ring which may be substituted with Y, and $R^{74}$ a $C_1$-$C_{10}$ alkyl group, an acetyl group, a phenyl group which may be substituted with Y, a pyridyl group which may be substituted with Y, a biphenyl group which may be substituted with Y, a naphthyl group which may be substituted with Y, a thienyl group which may be substituted with Y, a pyrrolyl group which may be substituted with Y, a furyl group which may be substituted with Y, or a condensed heteroaryl group which may be substituted with Y;

Y represents a halogen atom, a cyano group, a nitro group, an amino group, an epoxy group, a vinyl group, a $C_1$-$C_{10}$ alkyl group, a $C_1$-$C_{10}$ haloalkyl group, a $C_1$-$C_{10}$ alkoxy group, a $C_1$-$C_{10}$ cyanoalkyl group, a phenyl group which may be substituted with Z, a pyridyl group which may be substituted with Z, a biphenyl group which may be substituted with Z, a naphthyl group which may be substituted with Z, a thienyl group which may be substituted with Z, a pyrrolyl group which may be substituted with Z, a furyl group which may be substituted with Z or a condensed heteroaryl group which may be substituted with Z provided that if Y is two or more in number, Y may be the same or different; and Z represents a halogen atom, a cyano group, a nitro group, an amino group, an epoxy group, a vinyl group, a $C_1$-$C_{10}$ alkyl group, a $C_1$-$C_{10}$ haloalkyl group, a $C_1$-$C_{10}$ alkoxy group, a $C_1$-$C_{10}$ cyanoalkyl group, a phenyl group, a biphenyl group, a naphthyl group, a thienyl group, a pyrrolyl group, a furyl group or a condensed heteroaryl group provided that if Z is two or more in number, Z may be the same or different.

27. A method for making an electrode for an energy storage device according to claim 15, which method comprising electrolytically polymerizing an aminoquinoxaline compound represented by the formula (18b) on a current collector electrode,

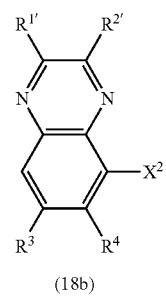

[Chemical Formula 22]

(18b)

wherein $R^{1'}$ and $R^{2'}$ join together to form —$CH_2CH_2CH_2$—, —$CH_2CH_2O$—, —$OCH_2CH_2$—, —$CH_2OCH_2$—, —$OCH_2O$—, —$CH_2CH_2S$—, —$SCH_2CH_2$—, —$CH_2SCH_2$—, —$CH_2CH_2N(R')$—, —$N(R')CH_2CH_2$—, —$CH_2N(R')CH_2$—, —$CH_2CH_2CH_2CH_2$—, —$CH_2CH_2CH_2O$—, —$OCH_2CH_2CH_2$—, —$CH_2CH_2OCH_2$—, —$CH_2OCH_2CH_2$—, —$CH_2OCH_2O$—, —$OCH_2CH_2O$—, —$SCH_2CH_2S$—, —$OCH_2CH_2S$—, —$SCH_2CH_2O$—, —$CH_2CH$=$CH$—, —$CH$=$CHCH_2$—, —$OCH$=$CH$—, —$CH$=$CHO$—, —$SCH$=$CH$—, —$CH$=$CHS$—, —$N(R')CH$=$CH$—, —$CH$=$CHN(R')$—, —$OCH$=$N$—, —$N$=$CHO$—, —$SCH$=$N$—, —$N$=$CHS$—, —$N(R')CH$=$N$—, —$N$=$CHN(R')$—, —$N(R')N$=$CH$—, —$CH$=$N(R')N$—, —$CH$=$CHCH$=$CH$—, —$OCH_2CH$=$CH$—, —$CH$=$CHCH_2O$—, —$N$=$CHCH$=$CH$—, —$CH$=$CHCH$=$N$—, —$N$=$CHCH$=$N$—, —$N$=$CHN$=$CH$—, or —$CH$=$NCH$=$N$— wherein a hydrogen atom bonded to a carbon atom of these groups may be substituted with Y, and R' represents a hydrogen atom, a $C_1$-$C_{10}$ alkyl group, a $C_1$-$C_{10}$ haloalkyl group, a $C_1$-$C_{10}$ cyanoalkyl group, a phenyl group which may be substituted with Z, a pyridyl group which may be substituted with Z, a biphenyl group which may be substituted with Z, a naphthyl group which may be substituted with Z, a thienyl group which may be substituted with Z, a pyrrolyl group which may be substituted with Z, a furyl group which may be substituted with Z, or a condensed heteroaryl group which may be substituted with Z;

$R^3$ and $R^4$ independently represent a hydrogen atom, a halogen atom, a cyano group, a nitro group, an amino group, a $C_1$-$C_{10}$ alkyl group, a $C_1$-$C_{10}$ alkoxy group, a phenyl group which may be substituted with Y, a pyridyl group which may be substituted with Y, a biphenyl group which may be substituted with Y, a naphthyl group which may be substituted with Y, a thienyl group which may be substituted with Y, a pyrrolyl group which may be substituted with Y, a furyl group which may be substituted with Y or a condensed heteroaryl group which may be substituted with Y provided that when $R^3$ and $R^4$ are, respectively, the above-defined phenyl, pyridyl, biphenyl, naphthyl, thienyl, pyrrolyl, furyl or condensed heteroaryl group, these groups may be joined through a single bond;

$X^2$ represents —NH—$R^{73}$—$NH_2$ or —NH—$R^{74}$, in which $R^{73}$ represents a $C_1$-$C_{10}$ alkylene group, a —C(O)$CH_2$—, —$CH_2$C(O)—, a divalent benzene ring which may be substituted with Y, a divalent pyridine ring which may be substituted with Y, a divalent biphenyl group which may be substituted with Y, a divalent naphthalene ring which may be substituted with Y, a divalent thiophene ring which may be substituted with Y, a divalent pyrrole ring which may be substituted with Y, a furan ring which may be substituted with Y, or a condensed hetero ring which may be substituted with Y, and $R^{74}$ is $C_1$-$C_{10}$ alkyl group, an acetyl group, a phenyl group which may be substituted with Y, a pyridyl group which may be substituted with Y, a biphenyl group which may be substituted with Y, a naphthyl group which may be substituted with Y, a thienyl group which may be substituted with Y, a pyrrolyl group which may be substituted with Y, a furyl group which may be substituted with Y, or a condensed heteroaryl group which may be substituted with Y;

Y represents a halogen atom, a cyano group, a nitro group, an amino group, an epoxy group, a vinyl group, a $C_1$-$C_{10}$ alkyl group, a $C_1$-$C_{10}$ haloalkyl group, a $C_1$-$C_{10}$ alkoxy group, a $C_1$-$C_{10}$ cyanoalkyl group, a phenyl group which may be substituted with Z, a pyridyl group which may be substituted with Z, a biphenyl group which may be substituted with Z, a naphthyl group which may be substituted with Z, a thienyl group which may be substituted with Z, a pyrrolyl group which may be substituted with Z, a furyl group which may be substituted with Z or a condensed heteroaryl group which may be substituted with Z provided that if Y is two or more in number, Y may be the same or different; and Z represents a halogen atom, a cyano group, a nitro group, an amino group, an epoxy group, a vinyl group, a $C_1$-$C_{10}$ alkyl group, a $C_1$-$C_{10}$ haloalkyl group, a $C_1$-$C_{10}$ alkoxy group, a $C_1$-$C_{10}$ cyanoalkyl group, a phenyl group, a biphenyl group, a naphthyl group, a thienyl group, a pyrrolyl group, a furyl group or a condensed heteroaryl group provided that if Z is two or more in number, Z may be the same or different.

28. A method for making an electrode for an energy storage device according to claim 16, which method comprising electrolytically polymerizing an aminoquinoxaline compound represented by the formula (18c) on a current collector electrode,

[Chemical Formula 23]

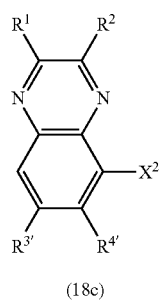

(18c)

wherein $R^1$ and $R^2$ independently represent a hydrogen atom, a hydroxyl group, a $C_1$-$C_{10}$ alkyl group, a $C_1$-$C_{10}$ alkoxy group, a phenyl group which may be substituted with Y, a pyridyl group which may be substituted with Y, a biphenyl group which may be substituted with Y, a naphthyl group which may be substituted with Y, a thienyl group which may be substituted with Y, a pyrrolyl group which may be substituted with Y, a furyl group which may be substituted with Y or a condensed heteroaryl group which may be substituted with Y provided that when $R^1$ and $R^2$ are, respectively, the above-defined phenyl, pyridyl, biphenyl, naphthyl, thienyl, pyrrolyl, furyl or condensed heteroaryl group, these groups may be joined through a single bond;

$R^{3'}$ and $R^{4'}$ join together to form —$CH_2CH_2CH_2$—, —$CH_2CH_2O$—, —$OCH_2CH_2$—, —$CH_2OCH_2$—, —$OCH_2O$—, —$CH_2CH_2S$—, —$SCH_2CH_2$—, —$CH_2SCH_2$—, —$CH_2CH_2N(R')$—, —$N(R')CH_2CH_2$—, —$CH_2N(R')CH_2$—, —$CH_2CH_2CH_2CH_2$—, —$CH_2CH_2CH_2O$—, —$OCH_2CH_2CH_2$—, —$CH_2CH_2OCH_2$—, —$CH_2OCH_2CH_2$—, —$CH_2OCH_2O$—, —$OCH_2CH_2O$—, —$SCH_2CH_2S$—, —$OCH_2CH_2S$—, —$SCH_2CH_2O$—, —$CH_2CH=CH$—, —$CH=CHCH_2$—, —$OCH=CH$—, —$CH=CHO$—, —$SCH=CH$—, —$CH=CHS$—, —$N(R')CH=CH$—, —$CH=CHN(R')$—, —$OCH=N$—, —$N=CHO$—, —$SCH=N$—, —$N=CHS$—, —$N(R')CH=N$—, —$N=CHN(R')$—, —$N(R')N=CH$—, —$CH=N(R')N$—, —$CH=CHCH=CH$—, —$OCH_2CH=CH$—, —$CH=CHCH_2O$—, —$N=CHCH=CH$—, —$CH=CHCH=N$—, —$N=CHCH=N$—, —$N=CHN=CH$—, or —$CH=NCH=N$— wherein a hydrogen atom bonded to a carbon atom of these groups may be substituted with Y, and R' represents a hydrogen atom, a $C_1$-$C_{10}$ alkyl group, a $C_1$-$C_{10}$ haloalkyl group, a $C_1$-$C_{10}$ cyanoalkyl group, a phenyl group which may be substituted with Z, a pyridyl group which may be substituted with Z, a biphenyl group which may be substituted with Z, a naphthyl group which may be substituted with Z, a thienyl group which may be substituted with Z, a pyrrolyl group which may be substituted with Z, a furyl group which may be substituted with Z, or a condensed heteroaryl group which may be substituted with Z;

$X^2$ represents —NH—$R^{73}$—$NH_2$ or —NH—$R^{74}$, in which $R^{73}$ represents a $C_1$-$C_{10}$ alkylene group, a —C(O)$CH_2$—, —$CH_2C(O)$—, a divalent benzene ring which may be substituted with Y, a divalent pyridine ring which may be substituted with Y, a divalent biphenyl group which may be substituted with Y, a divalent naphthalene ring which may be substituted with Y, a divalent thiophene ring which may be substituted with Y, a divalent pyrrole ring which may be substituted with Y, a furan ring which may be substituted with Y, or a condensed hetero ring which may be substituted with Y, and $R^{74}$ a $C_1$-$C_{10}$ alkyl group, an acetyl group, a phenyl group which may be substituted with Y, a pyridyl group which may be substituted with Y, a biphenyl group which may be substituted with Y, a naphthyl group which may be substituted with Y, a thienyl group which may be substituted with Y, a pyrrolyl group which may be substituted with Y, a furyl group which may be substituted with Y, or a condensed heteroaryl group which may be substituted with Y;

Y represents a halogen atom, a cyano group, a nitro group, an amino group, an epoxy group, a vinyl group, a $C_1$-$C_{10}$ alkyl group, a $C_1$-$C_{10}$ haloalkyl group, a $C_1$-$C_{10}$ alkoxy group, a $C_1$-$C_{10}$ cyanoalkyl group, a phenyl group which may be substituted with Z, a pyridyl group which may be substituted with Z, a biphenyl group which may be substituted with Z, a naphthyl group which may be substituted with Z, a thienyl group which may be substituted with Z, a pyrrolyl group which may be substituted with Z, a furyl group which may be substituted with Z or a condensed heteroaryl group which may be substituted with Z provided that if Y is two or more in number, Y may be the same or different; and Z represents a halogen atom, a cyano group, a nitro group, an amino group, an epoxy group, a vinyl group, a $C_1$-$C_{10}$ alkyl group, a $C_1$-$C_{10}$ haloalkyl group, a $C_1$-$C_{10}$ alkoxy group, a $C_1$-$C_{10}$ cyanoalkyl group, a phenyl group, a biphenyl group, a naphthyl group, a thienyl group, a pyrrolyl group, a furyl group or a condensed heteroaryl group provided that if Z is two or more in number, Z may be the same or different.

29. A method for making an electrode for an energy storage device according to claim 17, which method comprising electrolytically polymerizing an aminoquinoxaline compound represented by the formula (18d) on a current collector electrode,

[Chemical Formula 24]

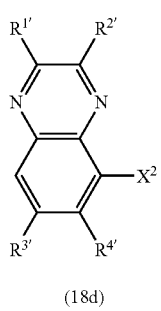

(18d)

wherein $R^{1'}$ and $R^{2'}$ join together to form —$CH_2CH_2CH_2$—, —$CH_2CH_2O$—, —$OCH_2CH_2$—, —$CH_2OCH_2$—, —$OCH_2O$—, —$CH_2CH_2S$—, —$SCH_2CH_2$—, —$CH_2SCH_2$—, —$CH_2CH_2N(R')$—, —$N(R')CH_2CH_2$—, —$CH_2N(R')CH_2$—, —$CH_2CH_2CH_2CH_2$—, —$CH_2CH_2CH_2O$—, —$OCH_2CH_2CH_2$—, —$CH_2CH_2OCH_2$—, —$CH_2OCH_2CH_2$—, —$CH_2OCH_2O$—, —$OCH_2CH_2O$—, —$SCH_2CH_2S$—, —$OCH_2CH_2S$—, —$SCH_2CH_2O$—, —$CH_2CH=CH$—, —$CH=CHCH_2$—, —$OCH=CH$—, —$CH=CHO$—, —$SCH=CH$—, —$CH=CHS$—, —$N(R')CH=CH$—, —$CH=CHN(R')$—, —$OCH=N$—, —$N=CHO$—, —$SCH=N$—, —$N=CHS$—, —$N(R')CH=N$—, —$N=CHN(R')$—, —$N(R')N=CH$—, —$CH=N(R')N$—, —$CH=CHCH=CH$—, —$OCH_2CH=CH$—, —$CH=CHCH_2O$—, —$N=CHCH=CH$—, —$CH=CHCH=N$—, —$N=CHCH=N$—, —$N=CHN=CH$—, or —$CH=NCH=N$— wherein a hydrogen atom bonded to a carbon atom of these groups may be substituted with Y, and R' represents a hydrogen atom, a $C_1$-$C_{10}$ alkyl group, a $C_1$-$C_{10}$ haloalkyl group, a $C_1$-$C_{10}$ cyanoalkyl group, a phenyl group which may be substituted with Z, a pyridyl group which may be substituted with Z, a biphenyl group which may be substituted with Z, a naphthyl group which may be substituted with Z, a thienyl group which may be substituted with Z, a pyrrolyl group which may be substituted with Z, a furyl group which may be substituted with Z, or a condensed heteroaryl group which may be substituted with Z;

$R^{3'}$ and $R^{4'}$ join together to form —$CH_2CH_2CH_2$—, —$CH_2CH_2O$—, —$OCH_2CH_2$—, —$CH_2OCH_2$—, —$OCH_2O$—, —$CH_2CH_2S$—, —$SCH_2CH_2$—, —$CH_2SCH_2$—, —$CH_2CH_2N(R')$—, —$N(R')CH_2CH_2$—, —$CH_2N(R')CH_2$—, —$CH_2CH_2CH_2CH_2$—, —$CH_2CH_2CH_2O$—, —$OCH_2CH_2CH_2$—, —$CH_2CH_2OCH_2$—, —$CH_2OCH_2CH_2$—, —$CH_2OCH_2O$—, —$OCH_2CH_2O$—, —$SCH_2CH_2S$—, —$OCH_2CH_2S$—, —$SCH_2CH_2O$—, —$CH_2CH=CH$—, —$CH=CHCH_2$—, —$OCH=CH$—, —$CH=CHO$—, —$SCH=CH$—, —$CH=CHS$—, —$N(R')CH=CH$—, —$CH=CHN(R')$—, —$OCH=N$—, —$N=CHO$—, —$SCH=N$—, —$N=CHS$—, —$N(R')CH=N$—, —$N=CHN(R')$—, —$N(R')N=CH$—, —$CH=N(R')N$—, —$CH=CHCH=CH$—, —$OCH_2CH=CH$—, —$CH=CHCH_2O$—, —$N=CHCH=CH$—, —$CH=CHCH=N$—, —$N=CHCH=N$—, —$N=CHN=CH$—, or —$CH=NCH=N$— wherein a hydrogen atom bonded to a carbon atom of these groups may be substituted with Y, and R' represents a hydrogen atom, a $C_1$-$C_{10}$ alkyl group, a $C_1$-$C_{10}$ haloalkyl group, a $C_1$-$C_{10}$ cyanoalkyl group, a phenyl group which may be substituted with Z, a pyridyl group which may be substituted with Z, a biphenyl group which may be substituted with Z, a naphthyl group which may be substituted with Z, a thienyl group which may be substituted with Z, a pyrrolyl group which may be substituted with Z, a furyl group which may be substituted with Z, or a condensed heteroaryl group which may be substituted with Z;

$X^2$ represents —NH—$R^{73}$—$NH_2$ or —NH—$R^{74}$, in which $R^{73}$ represents a $C_1$-$C_{10}$ alkylene group, a —C(O)$CH_2$—, —$CH_2C(O)$—, a divalent benzene ring which may be substituted with Y, a divalent pyridine ring which may be substituted with Y, a divalent biphenyl group which may be substituted with Y, a divalent naphthalene ring which may be substituted with Y, a divalent thiophene ring which may be substituted with Y, a divalent pyrrole ring which may be substituted with Y, a furan ring which may be substituted with Y, or a condensed hetero ring which may be substituted with Y, and $R^{74}$ a $C_1$-$C_{10}$ alkyl group, an acetyl group, a phenyl group which may be substituted with Y, a pyridyl group which may be substituted with Y, a biphenyl group which may be substituted with Y, a naphthyl group which may be substituted with Y, a thienyl group which may be substituted with Y, a pyrrolyl group which may be substituted with Y, a furyl group which may be substituted with Y, or a condensed heteroaryl group which may be substituted with Y;

Y represents a halogen atom, a cyano group, a nitro group, an amino group, an epoxy group, a vinyl group, a $C_1$-$C_{10}$ alkyl group, a $C_1$-$C_{10}$ haloalkyl group, a $C_1$-$C_{10}$ alkoxy group, a $C_1$-$C_{10}$ cyanoalkyl group, a phenyl group which may be substituted with Z, a pyridyl group which may be substituted with Z, a biphenyl group which may be substituted with Z, a naphthyl group which may be substituted with Z, a thienyl group which may be substituted with Z, a pyrrolyl group which may be substituted with Z, a furyl group which may be substituted with Z or a condensed heteroaryl group which may be substituted with Z provided that if Y is two or more in number, Y may be the same or different; and Z represents a halogen atom, a cyano group, a nitro group, an amino group, an epoxy group, a vinyl group, a $C_1$-$C_{10}$ alkyl group, a $C_1$-$C_{10}$ haloalkyl group, a $C_1$-$C_{10}$ alkoxy group, a $C_1$-$C_{10}$ cyanoalkyl group, a phenyl group, a biphenyl group, a naphthyl group, a thienyl group, a pyrrolyl group, a furyl group or a condensed heteroaryl group provided that if Z is two or more in number, Z may be the same or different.

* * * * *